(12) United States Patent
Zhang et al.

(10) Patent No.: US 12,113,987 B2
(45) Date of Patent: Oct. 8, 2024

(54) MULTI-PASS DECODER-SIDE MOTION VECTOR REFINEMENT

(71) Applicant: QUALCOMM Incorporated, San Diego, CA (US)

(72) Inventors: Zhi Zhang, Munich (DE); Han Huang, San Diego, CA (US); Chun-Chi Chen, San Diego, CA (US); Yan Zhang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/556,142

(22) Filed: Dec. 20, 2021

(65) Prior Publication Data

US 2022/0201315 A1 Jun. 23, 2022

Related U.S. Application Data

(60) Provisional application No. 63/129,221, filed on Dec. 22, 2020.

(51) Int. Cl.
*H04N 19/139* (2014.01)
*H04N 19/132* (2014.01)
(Continued)

(52) U.S. Cl.
CPC ......... *H04N 19/139* (2014.11); *H04N 19/132* (2014.11); *H04N 19/157* (2014.11);
(Continued)

(58) Field of Classification Search
CPC .... H04N 19/176; H04N 19/105; H04N 19/52; H04N 19/513; H04N 19/137; H04N 19/577; H04N 19/139; H04N 19/56
See application file for complete search history.

(56) References Cited

U.S. PATENT DOCUMENTS

2017/0324973 A1 11/2017 Tanner et al.
2019/0238883 A1* 8/2019 Chen ................... H04N 19/573
(Continued)

FOREIGN PATENT DOCUMENTS

WO 2018121506 A1 7/2018
WO 2020084473 A1 4/2020
(Continued)

OTHER PUBLICATIONS

Abdoli M., et al., "Non-CE3: Decoder-Side Intra Mode Derivation with Prediction Fusion Using Planar", JVET-O0449-2, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-9.
(Continued)

*Primary Examiner* — Daniel Chang
(74) *Attorney, Agent, or Firm* — QUALCOMM Incorporated; Espartaco Diaz Hidalgo

(57) ABSTRACT

An example device includes memory configured to store video data and one or more processors coupled to the memory. The one or more processors are configured to apply a multi-pass DMVR to a motion vector for a block of the video data to determine at least one refined motion vector and decode the block based on the at least one refined motion vector. The multi-pass DMVR includes a block-based first pass, a sub-block-based second pass, and a sub-block-based third pass.

20 Claims, 17 Drawing Sheets

(51) Int. Cl.
*H04N 19/157* (2014.01)
*H04N 19/176* (2014.01)
*H04N 19/186* (2014.01)
*H04N 19/513* (2014.01)

(52) U.S. Cl.
CPC ......... *H04N 19/176* (2014.11); *H04N 19/186* (2014.11); *H04N 19/513* (2014.11)

(56) References Cited

U.S. PATENT DOCUMENTS

| | | | |
|---|---|---|---|
| 2019/0387251 A1* | 12/2019 | Lin | H04N 19/105 |
| 2020/0195960 A1* | 6/2020 | Zhang | H04N 19/184 |
| 2020/0204820 A1* | 6/2020 | Zhang | H04N 19/52 |
| 2020/0213612 A1* | 7/2020 | Liu | H04N 19/184 |
| 2020/0221117 A1* | 7/2020 | Liu | H04N 19/56 |
| 2020/0221122 A1 | 7/2020 | Ye et al. | |
| 2020/0236388 A1 | 7/2020 | Esenlik et al. | |
| 2020/0359045 A1* | 11/2020 | Liu | H04N 19/523 |
| 2020/0366928 A1* | 11/2020 | Liu | H04N 19/176 |
| 2020/0374544 A1* | 11/2020 | Liu | H04N 19/147 |
| 2020/0382770 A1* | 12/2020 | Zhang | H04N 19/70 |
| 2020/0382771 A1* | 12/2020 | Liu | H04N 19/52 |
| 2020/0382795 A1* | 12/2020 | Zhang | H04N 19/137 |
| 2020/0396466 A1* | 12/2020 | Zhang | H04N 19/105 |
| 2020/0404320 A1* | 12/2020 | Zhang | H04N 19/56 |
| 2020/0413038 A1* | 12/2020 | Zhang | H04N 19/176 |
| 2020/0413044 A1* | 12/2020 | Zhang | H04N 19/184 |
| 2020/0413045 A1* | 12/2020 | Zhang | H04N 19/96 |
| 2020/0413048 A1* | 12/2020 | Zhang | H04N 19/583 |
| 2021/0014520 A1* | 1/2021 | Zhang | H04N 19/176 |
| 2021/0029362 A1* | 1/2021 | Liu | H04N 19/105 |
| 2021/0051339 A1* | 2/2021 | Liu | H04N 19/176 |
| 2021/0051345 A1* | 2/2021 | Tsai | H04N 19/52 |
| 2021/0076061 A1* | 3/2021 | Lin | H04N 19/137 |
| 2021/0084328 A1* | 3/2021 | Sethuraman | H04N 19/573 |
| 2021/0105482 A1* | 4/2021 | Zhang | H04N 19/96 |
| 2021/0127129 A1* | 4/2021 | Zhang | H04N 19/96 |
| 2021/0144400 A1* | 5/2021 | Liu | H04N 19/70 |
| 2021/0152846 A1* | 5/2021 | Zhang | H04N 19/543 |
| 2021/0160527 A1* | 5/2021 | Chuang | H04N 19/159 |
| 2021/0185338 A1* | 6/2021 | Xiu | H04N 19/176 |
| 2021/0227209 A1* | 7/2021 | Liu | H04N 19/80 |
| 2021/0227211 A1* | 7/2021 | Liu | H04N 19/59 |
| 2021/0227250 A1* | 7/2021 | Liu | H04N 19/159 |
| 2021/0235083 A1* | 7/2021 | Liu | H04N 19/186 |
| 2021/0235108 A1* | 7/2021 | Zhang | H04N 19/70 |
| 2021/0235110 A1* | 7/2021 | Liu | H04N 19/52 |
| 2021/0266585 A1* | 8/2021 | Liu | H04N 19/573 |
| 2021/0266588 A1* | 8/2021 | Liu | H04N 19/70 |
| 2021/0289221 A1* | 9/2021 | Misra | H04N 19/96 |
| 2021/0314596 A1* | 10/2021 | Wang | H04N 19/52 |
| 2021/0314628 A1* | 10/2021 | Zhang | H04N 19/82 |
| 2021/0344909 A1* | 11/2021 | Liu | H04N 19/52 |
| 2021/0344969 A1* | 11/2021 | Zhang | H04N 19/139 |
| 2021/0360279 A1* | 11/2021 | Liu | H04N 19/46 |
| 2021/0368198 A1* | 11/2021 | Zhang | H04N 19/513 |
| 2024/0171732 A1* | 5/2024 | Wang | H04N 19/577 |

FOREIGN PATENT DOCUMENTS

| | | |
|---|---|---|
| WO | 2020182216 A1 | 9/2020 |
| WO | 2020185506 A1 | 9/2020 |

OTHER PUBLICATIONS

Bossen F., et al., "VTM Common Test Conditions and Software Reference Configurations for SDR Video", JVET-T2010-v1, Joint Video Experts Team (JVET) of ITU-T SG 16 WP 3 and ISO/IEC JTC 1/SC 29, 20th Meeting, by teleconference, Oct. 7-16, 2020, pp. 1-7.

Bossen F., et al., "VTM Software Manual", Joint Video Experts Team (JVET) of ITU-T SG16 WP3 and ISO/IEC JTC1/SC29/WG11, Date saved: Feb. 5, 2019, pp. 1-34.

Bross B., et al., "Versatile Video Coding Editorial Refinements on Draft 10", JVET-T2001-v1, Joint Video Experts Team (JVET) of ITU-T SG 16 WP 3 and ISO/IEC JTC 1/SC 29, 20th Meeting, by Teleconference, Oct. 7-16, 2020, pp. 1-514.

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 29, 20th Meeting, by Teleconference, Oct. 7-16, 2020, pp. 1-515.

Chang Y-J., et al., "Compression Efficiency Methods Beyond VVC", Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, Oct. 11-Oct. 15, 20210, Online, (Motion Picture Expert Group or ISO/IEC JTC1/SC29/WG11), No. m5589031 Dec. 2020 (Dec. 31, 2020), XP030290689, pp. 1-13, Retrieved from the Internet: URL:https://dms.mpeg.expert/doc_end_user/documents/133_Teleconference/wg11/m55890-JVET-U0100-v1 [retrieved on Dec. 31, 2020].

Chen J., et al., "Algorithm Description for Versatile Video Coding and Test Model 10 (VTM 10)", 131. MPEG Meeting, 19th Meeting: by teleconference, Jun. 22-Jul. 1, 2020, Jun. 29-Jul. 3, 2020, Online, (Motion Picture Expert Group or ISO/IEC JTC1/SC29/WG11), No. m54825, Aug. 12, 2020 (Aug. 12, 2020), XP030293004, pp. 1-99, Retrieved from the Internet: URL:https://dms.mpeg.expert/doc_end_user/documents/131_Teleconference/wg11/m54825-JVET-S2002-v1-JVET-S2002-v1.zip JVET-S2002-v1.docx [retrieved on Aug. 12, 2020].

Chen J., et al., "Algorithm Description for Versatile Video Coding and Test Model 11 (VTM 11)", JVET-T2002-v2, Joint Video Experts Team (JVET) of ITU-T SG 16 WP 3 and ISO/IEC JTC 1/SC 29, 20th Meeting, by teleconference, Oct. 7-16, 2020, pp. 1-102.

Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.

Gao H., et al., "Decoder-Side Motion Vector Refinement in VVC: Algorithm and Hardware Implementation Considerations", IEEE Transactions on Circuits and Systems for Video Technology, Nov. 2020, pp. 1-15, URL: http://dx.doi.org/10.1109/TCSVT.2020.3037024.

Henry F., et al., "Residual Coefficient Sign Prediction", 4th JVET Meeting, Oct. 15, 2016-Oct. 21, 2016; Chengdu; (The Joint Video Exploration Team of ISO/IEC JTC1/SC29/WG11 and ITU-T SG.16 Wg 3), URL: http://phenix.int-evry.fr/vet/, No. JVET-D0031, Oct. 20, 2016 (Oct. 20, 2016), JVET-D0031-v4, XP030150258, pp. 1-6.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Lin Z-Y., et al., "CE10.2.1: OBMC", JVET-L0101-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-7.

Ray B., et al., "Unified PDPC for Angular Intra Modes", JVET-Q0391-v3, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-7.

Schwarz H., et al., "Additional Support of Dependent Quantization with 8 States", JVET-Q0243-v2, Joint Video Experts Team (JVET) of ITU-T SG 16 WP 3 and ISO/IEC JTC 1/SC 29/WG 11, 17th Meeting: Brussels, BE, Jan. 7-17, 2020, pp. 1-12.

Seregin V., et al., " CE4-3.1a and CE4-3.1b: Unidirectional Local Illumination Compensation with Affine Prediction", Joint Video Experts Team (JVET) of ITU-T SG 16 WP 3 and ISO/IEC JTC 1/SC 29/WG 11, JVET-O0066-v1, 15th Meeting: Gothenburg, SE, Jul. 3-12, 2019, pp. 1-5.

Seregin V., et al., "Block Shape Dependent Intra Mode Coding", 4 JVET Meeting, Chengdu, (The Joint Video Exploration Team of

(56) References Cited

OTHER PUBLICATIONS

ISO/IEC JTC1/SC29/WG11 and ITU-T SG.16 Wp 3), JVET-D0114r1, URL: http://phenix.int-evry.fr/jvet/, CN, Oct. 15-21, 2016, 3 pages.

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Winken M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-14.

Zhao X., et al., "Six Tap Intra Interpolation Filter," JVET Meeting, 4th Meeting, Chengdu, (The Joint Video Exploration Team (JVET) of ITU-T SG 16 WP 3 and ISO/IEC JTC 1/SC 29/WG 11), CN Oct. 15-21, 2016, No. JVET-D0119r1, pp. 1-3.

Han Y., et al., "CE4.4.6: Improvement on Merge/Skip mode," Joint Video Exploration Team (JVET) of ITU-T SG 16 WP 3 and ISO/IEC JTC 1/SC 29/WG 11, JVET-L0399, 12th Meeting: Macao, CN, Oct. 3-12, 2018, pp. 1-6.

Chang Y-J., et al., (Qualcomm): "EE2: Tests of Compression Efficiency Methods BeyondVVC", 22. JVET Meeting, Apr. 20-Apr. 28, 2021, Teleconference, (The Joint VideoExploration Team of ISO/IEC JTC1/SC29/WG11 and ITU-T SG.16), No. JVET-V0120, m56535, Apr. 22, 2021 (Apr. 22, 2021), 30 Pages, XP030294307, Retrieved from the Internet: URL: https://jvet-experts.org/doc_end_user/documents/22_Teleconference/wg11/JVET-V0120-v3.zip JVET-V0120-v2.docx [retrieved on Apr. 22, 2021] section [4.4 Multi-pass decoder sidemotion vectr refinement (test 3.4).

International Search Report and Written Opinion—PCT/US2021/064537—ISA/EPO—Apr. 20, 2022 15 Pages.

\* cited by examiner

MULTI-PASS DECODER-SIDE MOTION VECTOR REFINEMENT

This application claims the benefit of U.S. Provisional Application No. 63/129,221, filed Dec. 22, 2020, and entitled "MULTI-PASS DECODER-SIDE MOTION VECTOR REFINEMENT," the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for decoder-side motion vector derivation techniques. More particularly, this disclosure describes multi-pass decoder-side motion vector refinement techniques for use in video coding. In some draft video standards, a range of motion vector refinements may be too narrow for all cases. The techniques of this disclosure address this issue which may result in more accurate motion prediction and therefore, more accurate decoding and recreation of encoded video data.

In one example, a method includes applying a multi-pass decoder-side motion vector refinement (DMVR) to a motion vector for a block of the video data to determine at least one refined motion vector; and decoding the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

In another example, a device includes memory configured to store the video data; and one or more processors implemented in circuitry and communicatively coupled to the memory, the one or more processors being configured to: apply a multi-pass decoder-side motion vector refinement (DMVR) to a motion vector for a block of the video data to determine at least one refined motion vector; and decode the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

In another example, non-transitory computer-readable storage medium stores instructions, which, when executed, cause one or more processors to: apply a multi-pass decoder-side motion vector refinement (DMVR) to a motion vector for a block of the video data to determine at least one refined motion vector; and decode the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

In another example, a device includes means for applying a multi-pass decoder-side motion vector refinement (DMVR) to a motion vector for a block of the video data to determine at least one refined motion vector; and means for decoding the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

In one example, a method includes applying a multi-pass decoder-side motion vector refinement (DMVR) to a motion vector for a block of the video data to determine a refined motion vector, and coding the block based on the refined motion vector.

In another example, a device includes memory configured to store video data and one or more processors implemented in circuitry and communicatively coupled to the memory, the one or more processors being configured to perform any of the techniques of this disclosure.

In another example, a device includes at least one means for performing any of the techniques of this disclosure.

In another example, a computer-readable storage medium is encoded with instructions that, when executed, cause a programmable processor to perform any of the techniques of this disclosure.

The details of one or more examples are set forth in the accompanying drawings and the description below. Other features, objects, and advantages will be apparent from the description, drawings, and claims.

DETAILED DESCRIPTION

In some draft video standards, a range of motion vector refinements may be too narrow for all cases. This may result in faulty motion prediction and thereby less accurate decoding. The techniques of this disclosure address this issue which may result in more accurate motion prediction and therefore, more accurate decoding and recreation of encoded video data.

Figure 1:
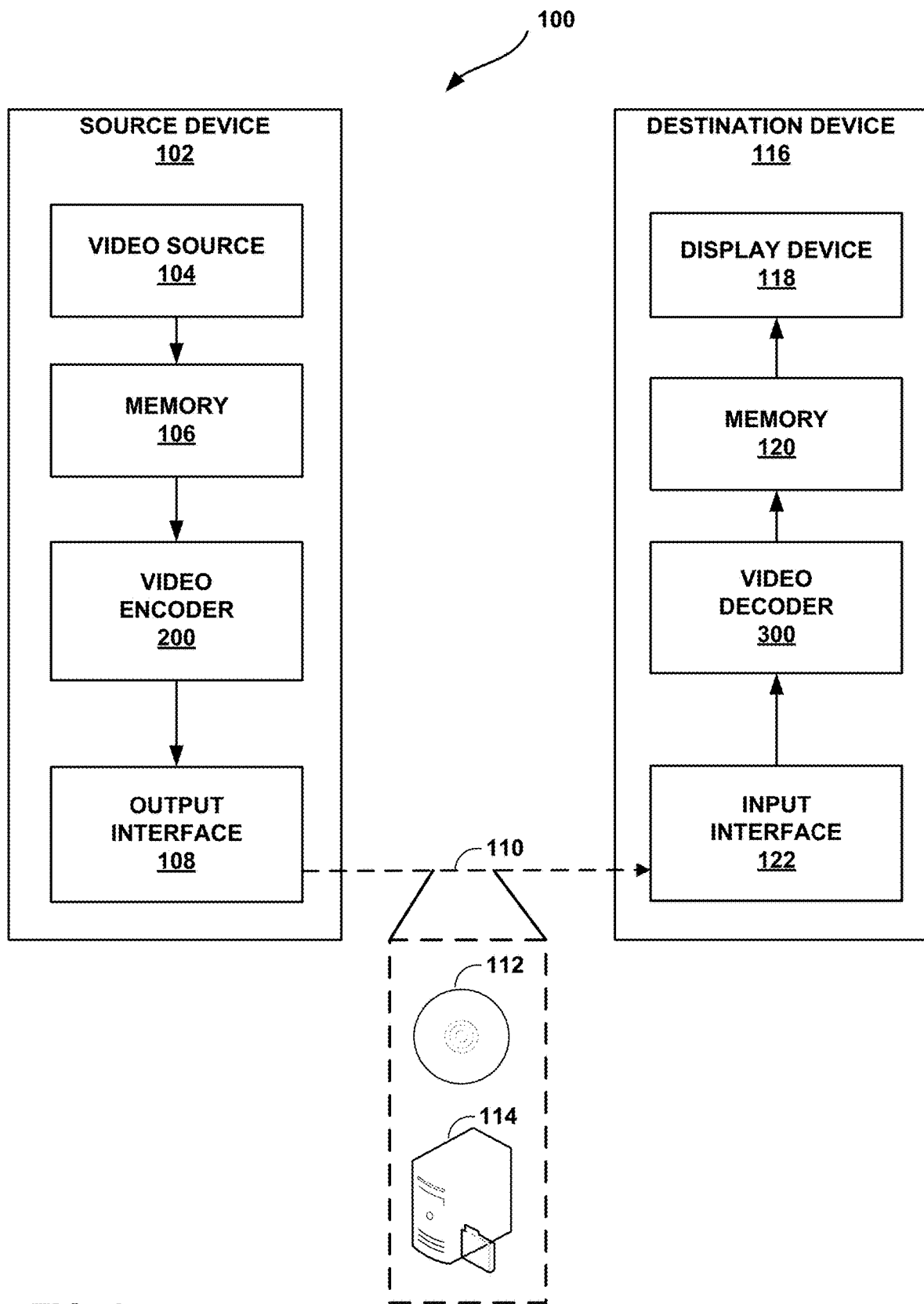
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder-side motion vector derivation. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video decoding device may perform techniques for decoder-side motion vector derivation techniques. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally, or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding Editorial Refinements on Draft 10," Joint Video Experts Team (JVET) of ITU-T SG 16 WP 3 and ISO/IEC JTC 1/SC 29/WG 11, 18$^{th}$ Meeting: by teleconference, 7-16 Oct. 2020, JVET-T2001-v1 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes applying a multi-pass decoder-side motion vector refinement (DMVR) to a motion vector for a block of the video data to determine at least one refined motion vector; and decoding the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

In accordance with the techniques of this disclosure, a device includes memory configured to store the video data; and one or more processors implemented in circuitry and communicatively coupled to the memory, the one or more processors being configured to: apply a multi-pass decoder-side motion vector refinement (DMVR) to a motion vector for a block of the video data to determine at least one refined motion vector; and decode the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

In accordance with the techniques of this disclosure, a non-transitory computer-readable storage medium stores instructions, which, when executed, cause one or more processors to: apply a multi-pass decoder-side motion vector refinement (DMVR) to a motion vector for a block of the video data to determine at least one refined motion vector; and decode the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

In accordance with the techniques of this disclosure, a device includes means for applying a multi-pass decoder-side motion vector refinement (DMVR) to a motion vector for a block of the video data to determine at least one refined motion vector; and means for decoding the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

In accordance with the techniques of this disclosure, a method includes applying a multi-pass decoder-side motion vector refinement (DMVR) to a motion vector for a block of the video data to determine a refined motion vector, and coding the block based on the refined motion vector.

In accordance with the techniques of this disclosure, a device includes memory configured to store video data and one or more processors implemented in circuitry and communicatively coupled to the memory, the one or more processors being configured to perform any of the techniques of this disclosure.

In accordance with the techniques of this disclosure, a device includes at least one means for performing any of the techniques of this disclosure.

In accordance with the techniques of this disclosure, a computer-readable storage medium is encoded with instructions that, when executed, cause a programmable processor to perform any of the techniques of this disclosure.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
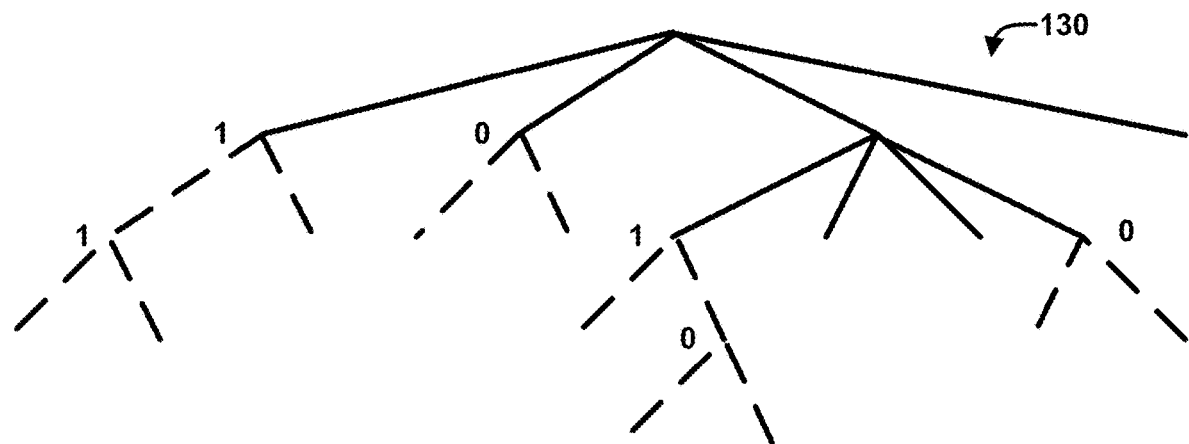
FIGS. 2A and 2B are conceptual diagrams illustrating an example quadtree binary tree (QTBT) structure, and a corresponding coding tree unit (CTU).
Figure 2B:
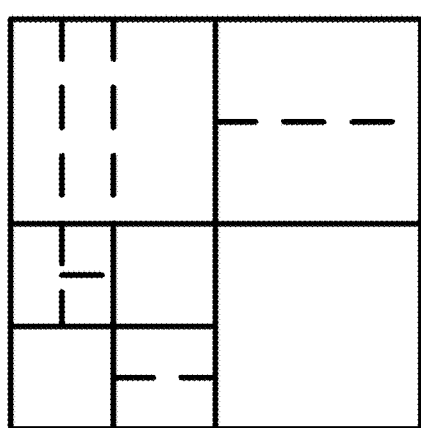

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Figure 3:
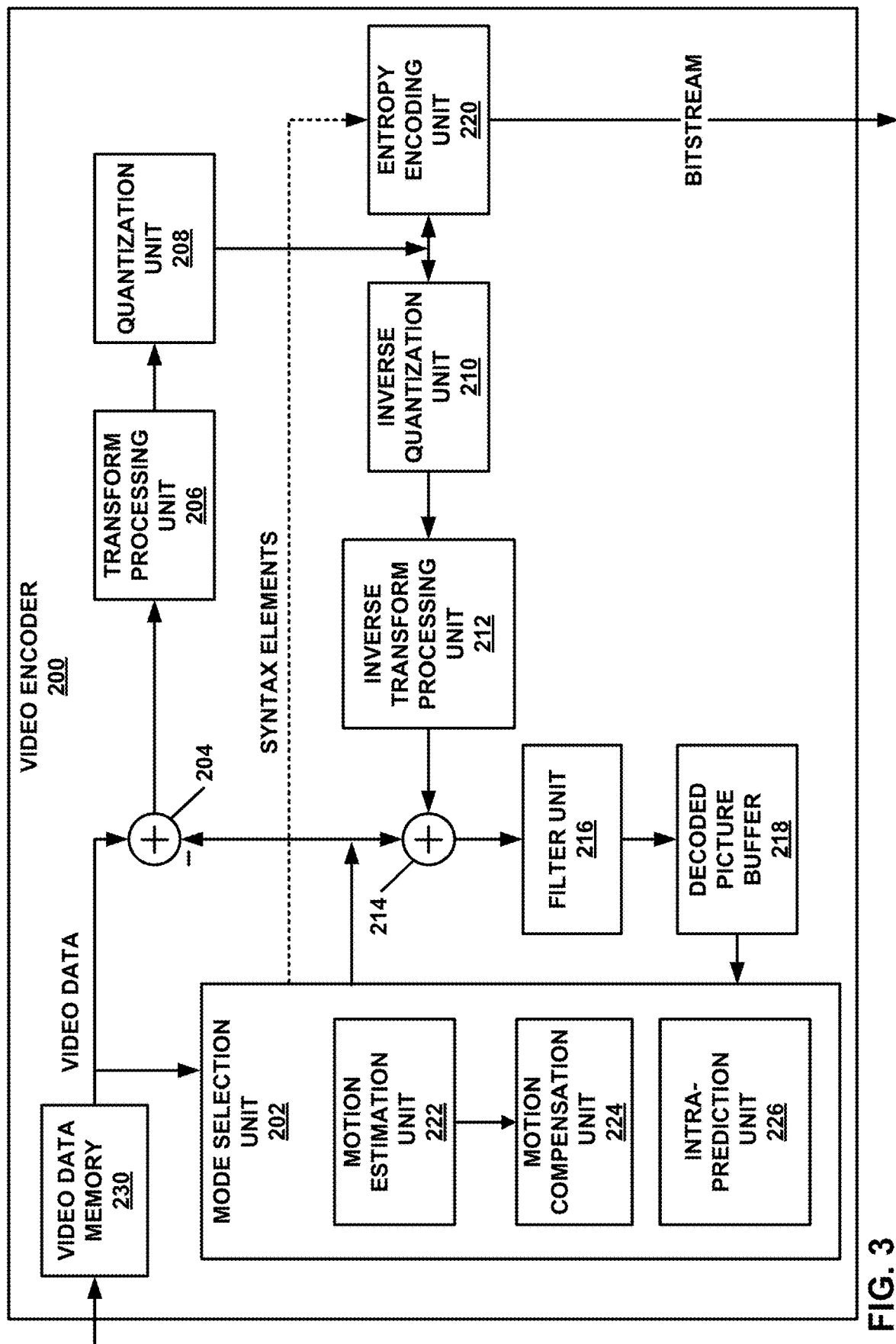
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 4:
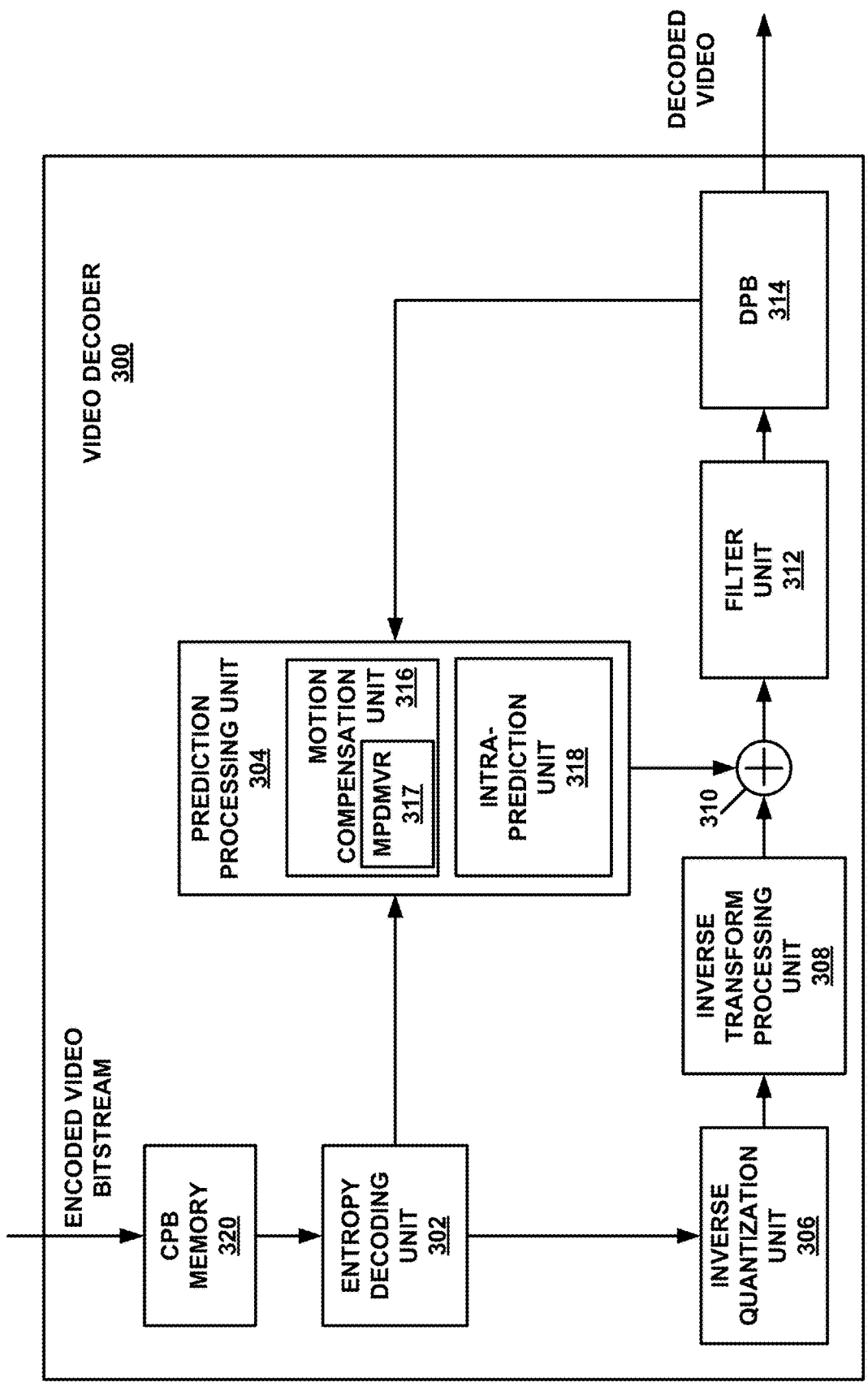
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components. Motion compensation unit 316 may include multi-pass DMVR unit (MPDMVR) 317 which is described in the discussion of motion compensation unit 316 below.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally, or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

In some examples, motion compensation unit 316 may include multi-pass DMVR unit 317. Multi-pass DMVR unit 317 may apply a multi-pass DMVR to a motion vector for a block of video data to determine a refined motion vector. The multi-pass DMVR may include a first pass, the first pass being block-based and applied to the block of the video data. The multi-pass DMVR may include a second pass, the second pass being sub-block-based and applied to at least one second pass sub=block of the block of the video data. The multi-pass DMVR may include a third pass, the third pass being sub-block-based and being applied to at least one third pass sub-block of the block of the video data. A second pass sub-block width may be equal to or less than a width of the block of the video data and a second pass sub-block height may be equal to or less than a height of the block of the video data. A third pass sub-block width may be equal to or less than the second pass sub-block width and a third pass sub-block height being equal to or less than the second pass sub-block height. Further examples and description of multi-pass DMVR techniques are described later in this disclosure.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processors implemented in circuitry and communicatively coupled to the memory, the one or more processors being configured to: apply a multi-pass decoder-side motion vector refinement (DMVR) to a motion vector for a block of the video data to determine at least one refined motion vector; and decode the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

Video decoder 300 also represents an example of a video decoding device including a memory configured to store video data, and one or more processing units implemented in circuitry and configured to apply a multi-pass decoder-side motion vector refinement (DMVR) to a motion vector for a block of the video data to determine a refined motion vector and decode the block based on the refined motion vector.

This disclosure is related to decoder-side motion vector derivation techniques (e.g., template matching, bilateral matching, decoder-side MV refinement, bi-directional optical flow, and the like). The techniques of this disclosure may be applied to any of the existing video codecs, such as HEVC (High Efficiency Video Coding), VVC (Versatile Video Coding), Essential Video Coding (EVC) or be an efficient coding tool in any future video coding standards. In this section, HEVC and JEM techniques and on-going works in Versatile Video Coding (VVC) related to this disclosure are firstly reviewed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. An algorithm description of Versatile Video Coding and Test Model 10 (VTM 10.0) may be referred to JVET-T2002 which is available from https://jvet-experts.org/.

CU structure and motion vector prediction in HEVC is now discussed. In HEVC, the largest coding unit in a slice is called a coding tree block (CTB) or coding tree unit (CTU). A CTB may contain a quad-tree the nodes of which are coding units.

The size of a CTB can range from 16×16 to 64×64 in the HEVC main profile (although technically 8×8 CTB sizes can be supported). A coding unit (CU) may have a size from the same size of a CTB to as small as 8×8. Each CU is coded with one mode, i.e., inter mode or intra mode. When a CU is inter coded, the CU may be further partitioned into 2 or 4 prediction units (PUs) or remain just one PU when further partitioning is not applied. When two PUs are present in one CU, the two PUs can each be half size rectangles (half the size of the CU) or two rectangle sizes with one being ¼ and the other being ¼ the size of the CU.

When the CU is inter coded, each PU has one set of motion information, which is derived with a unique inter prediction mode.

Motion vector prediction is now discussed. In the HEVC standard, there are two inter prediction modes, named merge mode (skip is considered as a special case of merge) and advanced motion vector prediction (AMVP) mode for a PU.

In either AMVP or merge mode, a motion vector (MV) candidate list is maintained for multiple motion vector predictors. The MVs, as well as reference indices in the merge mode, of the current PU are generated by taking one candidate from the MV candidate list. For example, video decoder 300 may maintain a MV candidate list.

The MV candidate list contains up to 5 candidates for the merge mode and only two candidates for the AMVP mode. A merge candidate may contain a set of motion information, e.g., MVs corresponding to both reference picture lists (list 0 and list 1) and the corresponding reference indices. If a merge candidate is identified by a merge index, the reference pictures used for the prediction of the current block, as well as the associated motion vectors are determined. On the other hand, under AMVP mode for each potential prediction direction from either list 0 or list 1, video encoder 200 may explicitly signal a reference index, together with an MV predictor (MVP) index, to the MV candidate list since the AMVP candidate contains only a MV. In AMVP mode, the predicted MVs can be further refined.

Video decoder 300 may derive the candidates for both modes similarly from the same spatial and temporal neighboring blocks.

Figure 5B:
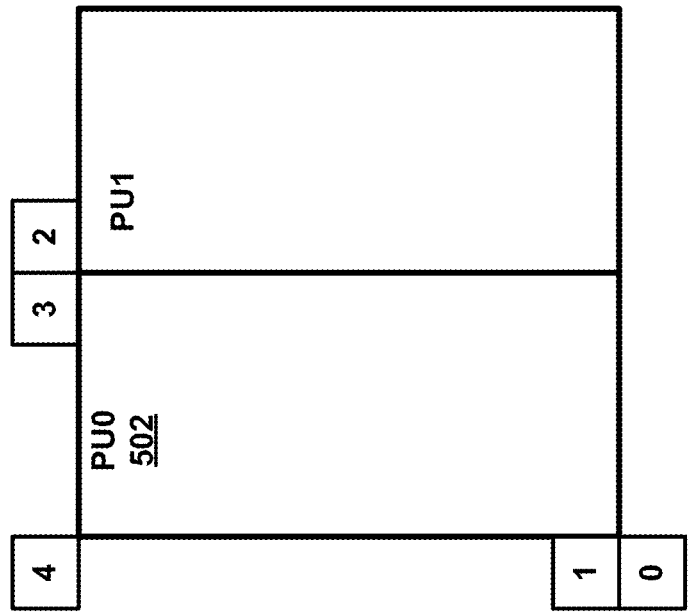
FIGS. 5A-5B are conceptual diagrams illustrating example spatial neighboring MV candidates for merge and AMVP modes, respectively.
Figure 5A:
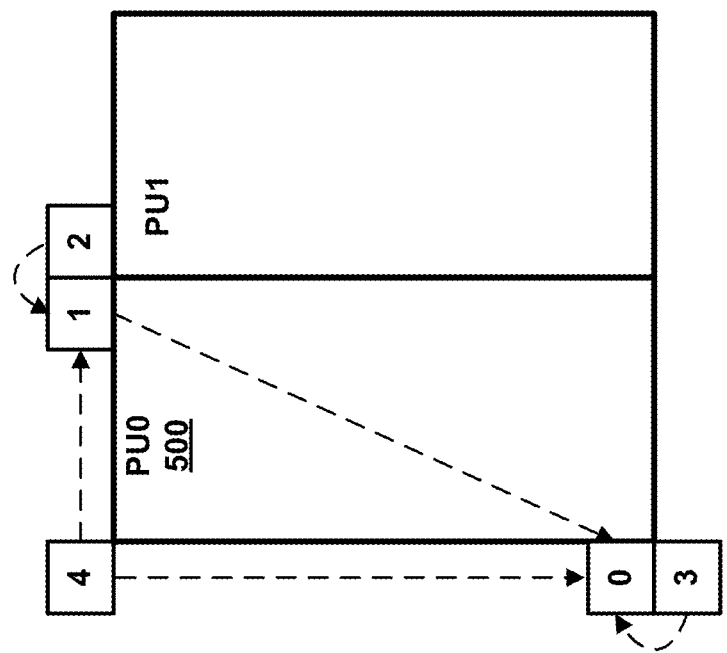

FIGS. 5A-5B are conceptual diagrams illustrating example spatial neighboring MV candidates for merge and AMVP modes, respectively. Spatial MV candidates are derived from the neighboring blocks shown in FIGS. 5A and 5B, for a specific PU (PU0), although the methods generating the candidates from the blocks differ for merge and AMVP modes.

In merge mode, up to four spatial MV candidates for PU0 500 can be derived with the order shown in FIG. 5A as increasing numbers, wherein the order is the following: left (0, A1), above (1, B1), above right (2, B0), below left (3, A0), and above left (4, B2). For example, video decoder 300 may derive up to four spatial MV candidates for PU0 500 using the order set forth above.

In AVMP mode, the neighboring blocks of PU0 502 are divided into two groups: left group consisting of the blocks 0 and 1, and above group consisting of the blocks 2, 3, and 4 as shown in FIG. 5B. For example, video decoder 300 may divide the neighboring blocks into the left group and the above group. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Temporal Motion Vector Prediction in HEVC is now discussed. Video decoder 300 may add a temporal motion vector predictor (TMVP) candidate, if enabled and available, into the MV candidate list after any spatial motion vector candidates. The process of motion vector derivation for TMVP candidates is the same for both merge and AMVP modes. However, the target reference index for the TMVP candidate in the merge mode may always be set to 0.

Figures 6A, 6B:
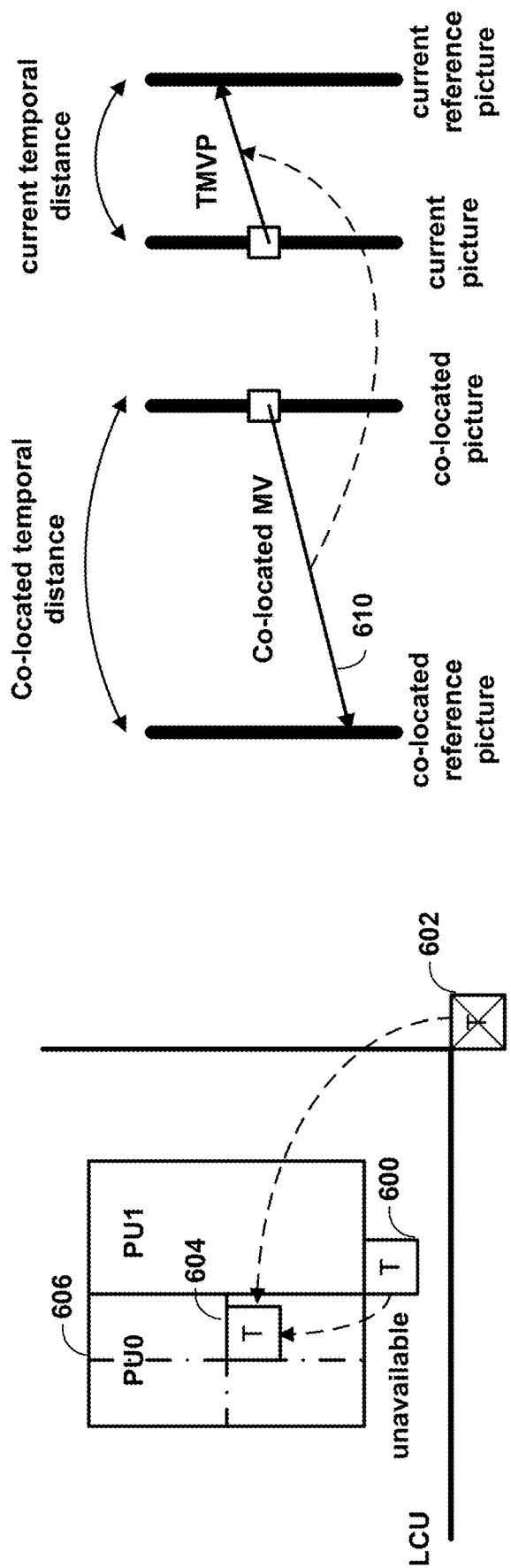
FIGS. 6A-6B are conceptual diagrams illustrating an example TMVP candidate and MV scaling, respectively.

FIGS. 6A-6B are conceptual diagrams illustrating an example TMVP candidate and MV scaling, respectively. The primary block location for TMVP candidate derivation is the bottom right block outside of the collocated PU shown in FIG. 6A as a block "T" 600, to compensate the bias to the above and left blocks used to generate spatial neighboring candidates. However, if that block is located outside of the current CTB row (shown as block 602) or motion information is not available, the block is substituted with a center block 604 of the PU0 606.

A motion vector for a TMVP candidate is derived from the co-located PU of the co-located picture, indicated in the slice level. The motion vector for the co-located PU is called a co-located MV.

Similar to temporal direct mode in AVC, to derive the TMVP candidate motion vector, co-located MV 610 need to be scaled to compensate the temporal distance differences, as shown in FIG. 6B. For example, video decoder 300 may scale co-located MV 610 to compensate for temporal distance differences.

Other aspects of motion prediction in HEVC are now discussed. Several aspects of merge and AMVP modes are worth mentioning as follows.

Motion vector scaling: the value of MVs is proportional to the distance of pictures in presentation time. An MV associates two pictures, the reference picture, and the picture containing the motion vector (e.g., the containing picture or the picture containing the block being predicted using the motion vector). When an MV is utilized to predict another MV, the time distance between the containing picture and the reference picture is calculated based on the Picture Order Count (POC) values.

For a motion vector to be predicted, both the motion vector's associated containing picture and reference picture may be different. Therefore, a new distance (based on POC) is calculated. The MV is scaled based on these two POC distances. For example, video decoder 300 may calculate the new distance based on POC and may scale the MV based on the two POC distances. For a spatial neighboring candidate, the containing pictures for the two MVs are the same, while the reference pictures are different. In HEVC, MV scaling applies to both TMVP and AMVP for spatial and temporal neighboring candidates.

Artificial motion vector candidate generation: If an MV candidate list is not complete, artificial MV candidates may be generated and inserted at the end of the list until the list has all the candidates (e.g., the list is full).

In merge mode, there are two types of artificial MV candidates: combined candidates which are derived only for B-slices and zero candidates used only for AMVP if the first type does not provide enough artificial candidates.

For each pair of candidates that are already in the candidate list and have necessary motion information, bi-directional combined MV candidates are derived by a combination of the MV of the first candidate referring to a picture in the list 0 and the MV of a second candidate referring to a picture in the list 1.

Pruning process for candidate insertion: Candidates from different blocks may happen to be the same, which decreases the efficiency of a merge/AMVP candidate list. A pruning process may be applied to solve this problem. During the pruning process, video decoder 300 compares one candidate against the others in the current candidate list to avoid inserting identical candidates to a certain extent. To reduce the complexity, the pruning process may be applied to a limited number of candidates rather than comparing each potential candidate with all the other existing candidates.

Template matching prediction is now discussed. Template matching (TM) prediction is a special merge mode based on Frame-Rate Up Conversion (FRUC) techniques. With this TM prediction mode, motion information of a block is not signaled, but derived at the decoder side by video decoder 300. TM prediction is applied to both AMVP mode and regular merge mode. In AMVP mode, MVP candidate selection is determined using base template matching to pick the candidate which reaches the minimal difference between current block template and reference block template. In regular merge mode, video encoder 200 signals a TM mode flag to indicate the use of TM and then TM is applied to the merge candidate indicated by merge index for MV refinement.

Figure 7:
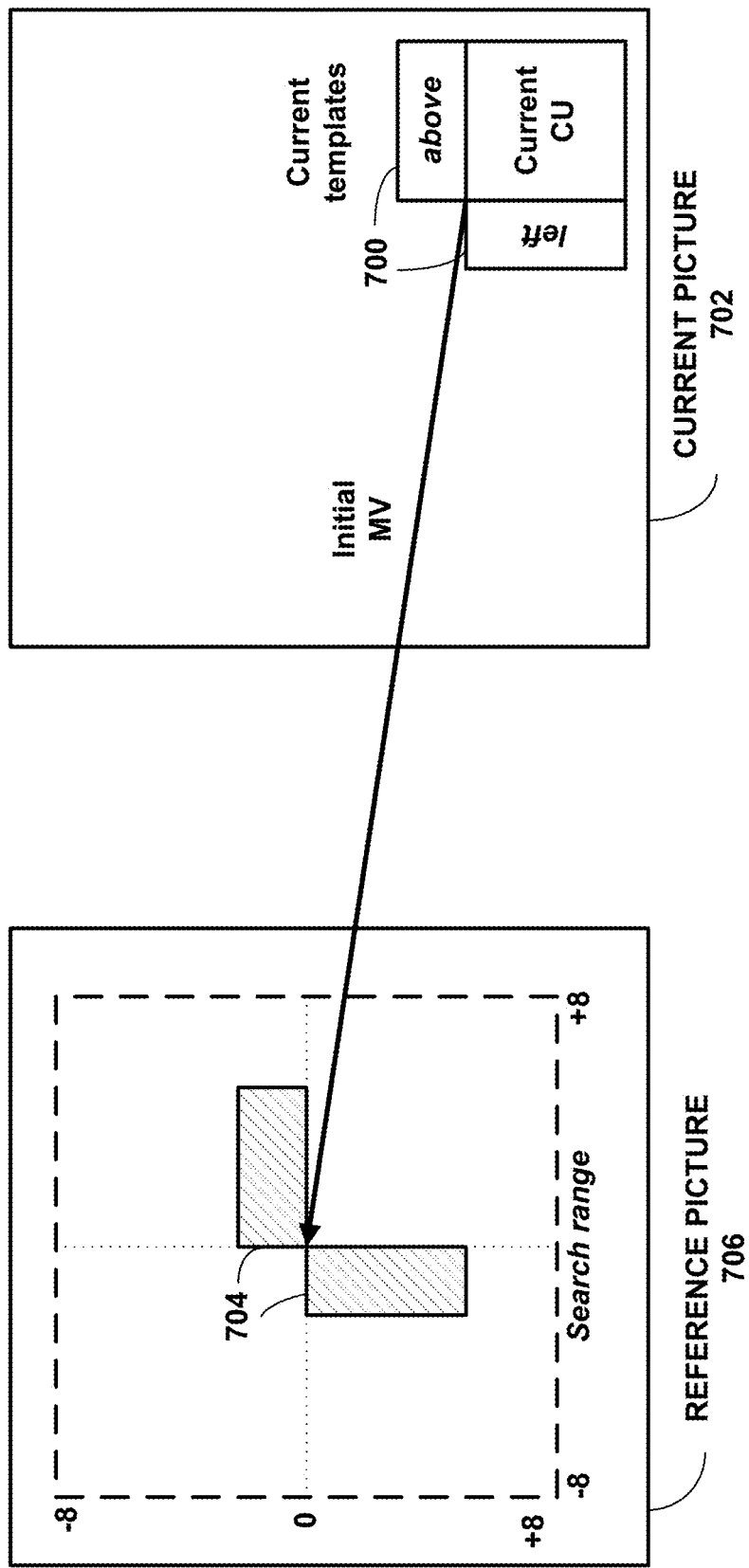
FIG. 7 is a conceptual diagram illustrating example template matching on a search area around an initial MV.

FIG. 7 is a conceptual diagram illustrating example template matching on a search area around an initial MV. As shown in FIG. 7, template matching may be used to derive motion information of the current CU. Deriving motion information may include finding the closest match between template 700 (top and/or left neighboring blocks of the current CU) in current picture 702 and a block 704 (e.g., the same size as the template) in reference picture 706. With an AMVP candidate selected based on initial matching error, the candidate's MVP is refined by template matching. With a merge candidate indicated by signaled merge index, the candidate's merged MVs corresponding to reference picture list0 (L0) and reference picture list1 (L1) are refined independently by template matching and then the less accurate MV is further refined again with the more accurate MV as a prior reference. For example, video decoder 300 may receive and parse the signaled merge index and apply template matching to the merged MVs to refine the MVs.

Cost function: When a motion vector points to a fractional sample position, video decoder 300 may use motion compensated interpolation. To reduce complexity, bi-linear interpolation instead of regular 8-tap discrete cosine transform-interpolation filter (DCT-IF) interpolation is used for both template matching and to generate templates on reference pictures. The matching cost C of template matching may be calculated as follows:

$$C = SAD + w \cdot (|MV_x - MV_x^s| + |MV_y - MV_y^s|)$$

where w is a weighting factor which is empirically set to 4, MV and $MV^s$ indicate the currently testing MV and the initial MV (e.g., an MVP candidate in AMVP mode or merged motion vector in merge mode), respectively. Sum of absolute differences (SAD) may be used as the matching cost of template matching.

When TM is used, motion is refined by using luma samples only. The derived motion will be used for both luma and chroma for motion compensation (MC) inter prediction. After MV is decided, final MC is performed using 8-taps interpolation filter for luma and 4-taps interpolation filter for chroma. For example, video decoder 300 may refine motion using only luma samples.

Search method: MV refinement may be a pattern-based MV search with the criterion of template matching cost. Two search patterns are supported—a diamond search and a cross search for MV refinement. For example, video decoder 300 may use a diamond search or a cross search for MV refinement. The MV is directly searched at quarter luma sample motion vector difference (MVD) accuracy with diamond pattern, followed by quarter luma sample MVD accuracy with cross pattern, and then this is followed by one-eighth luma sample MVD refinement with cross pattern.

The search range of MV refinement may be set equal to (−8, +8) luma samples around the initial MV.

Bilateral matching prediction is now discussed. Bilateral matching (a.k.a., Bilateral Merge) (BM) prediction is another merge mode base on FRUC techniques. When a determination is made to apply the BM mode for a block, two initial MVs (MV0 and MV1) are derived by using a signaled merge candidate index to select the merge candidate in a constructed merge list. Video decoder 300 may perform a bilateral matching search around the MV0 and MV1 and derive the final MV0' and MV1' based on the minimum bilateral matching cost.

Figure 8A:
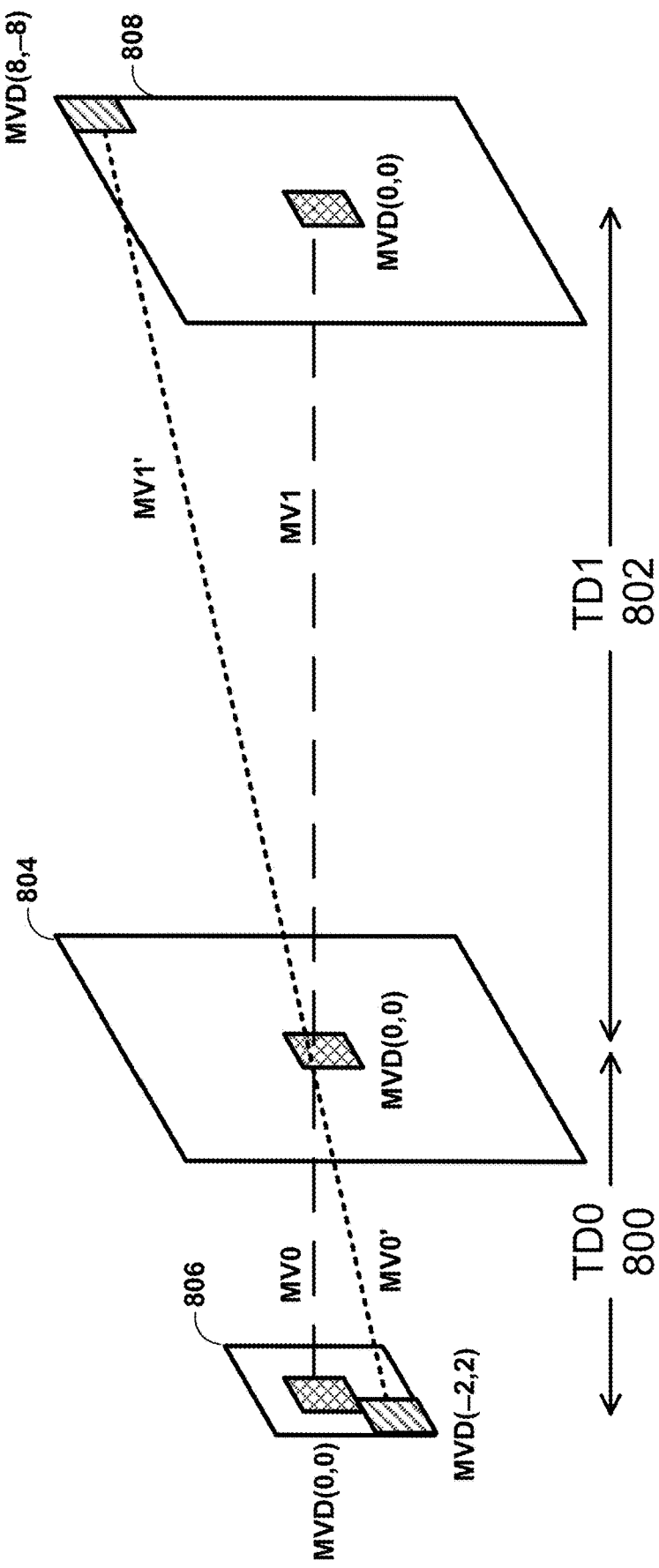
FIGS. 8A-8B are conceptual diagrams illustrating examples of MVD0 and MVD1 being proportional based on the temporal distances and examples of MVD0 and MVD1 being mirrored regardless of the temporal distances, respectively.
Figure 8B:
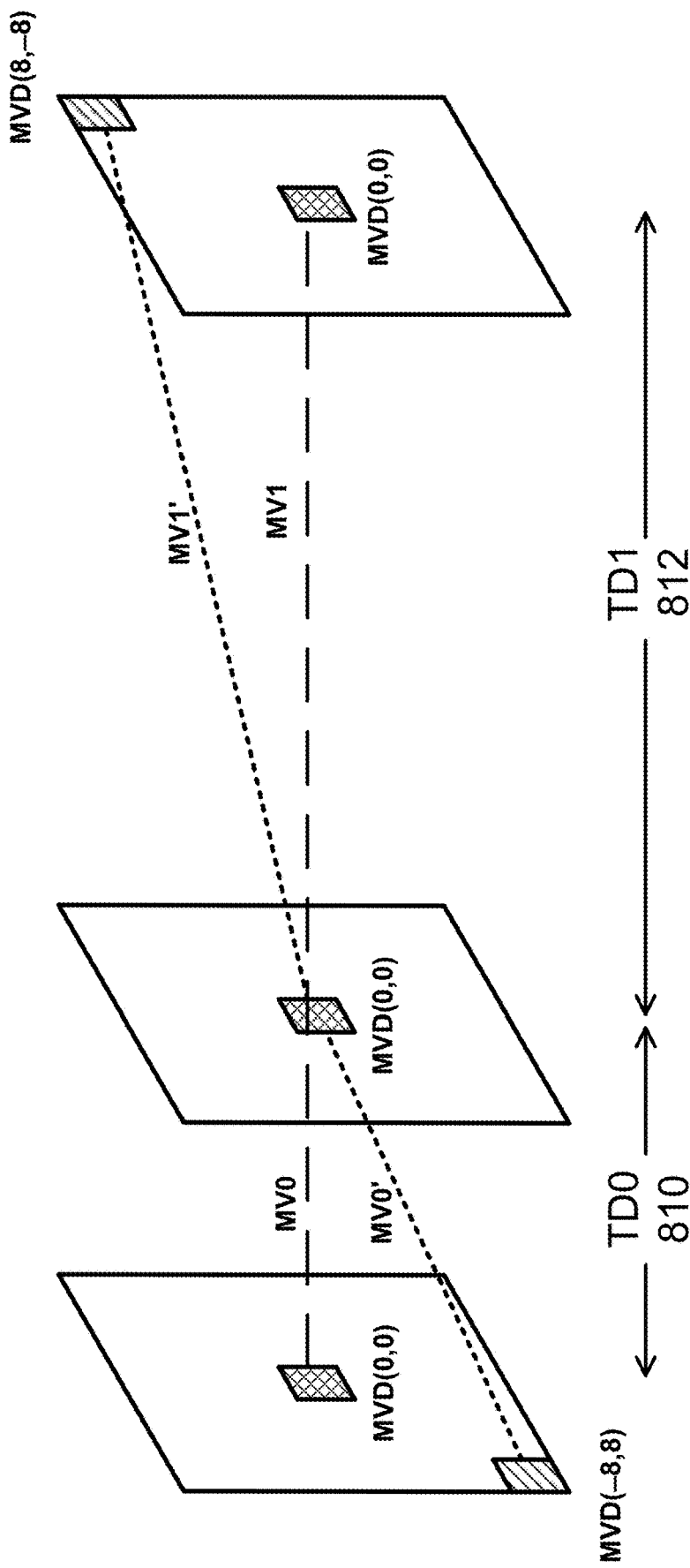

FIGS. 8A-8B are conceptual diagrams illustrating examples of MVD0 and MVD1 being proportional based on the temporal distances and examples of MVD0 and MVD1 being mirrored regardless of the temporal distances, respectively. The motion vector differences MVD0 (denoted by MV0'−MV0) and MVD1 (denoted by MV1'−MV1) pointing to the two reference blocks may be proportional to the temporal distances (TD), e.g., TD0 800 and TD1 802, between the current picture 804 and the two reference pictures 806 and 808. FIG. 8A shows an example of MVD0 and MVD1 wherein, the TD1 802 is 4 times TD0 800.

However, there is an optional design wherein MVD0 and MVD1 are mirrored regardless of the temporal distances TD0 and TD1. FIG. 8B shows an example of mirrored MVD0 and MVD1 wherein, the TD1 812 is 4 times TD0 810.

Figure 9:
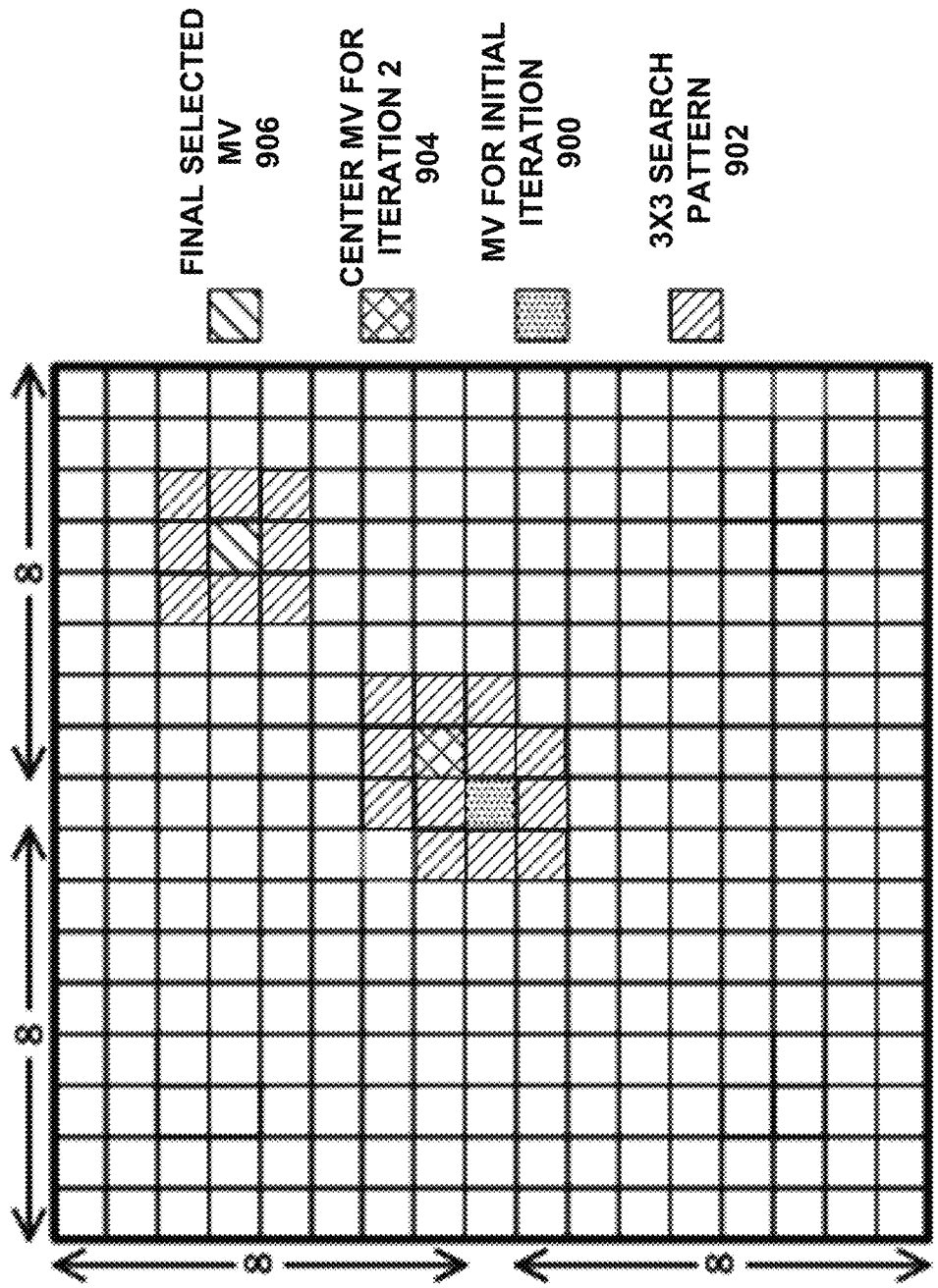
FIG. 9 is a conceptual diagram illustrating an example of a 3×3 square search pattern in the search range [−8, 8].

FIG. 9 is a conceptual diagram illustrating an example of a 3×3 square search pattern in the search range [−8, 8]. Bilateral matching may include performing a local search around the initial MV0 and MV1 to derive the final MV0' and MV1'. To apply the local search, video decoder 300 may apply a 3×3 square search pattern and loops through the search range [−8, 8]. In each search iteration, the bilateral matching cost of the eight surrounding MVs in the search pattern are calculated and compared to the bilateral matching cost of center MV. The MV which has minimum bilateral matching cost becomes the new center MV in the next search iteration. The local search is terminated when the current center MV has a minimum cost within the 3×3 square search pattern or the local search reaches the pre-defined maximum number of search iterations. For example, video decoder 300 may perform bilateral matching as described herein. In the example of FIG. 9, an initial MV 900 is used and a 3×3 search pattern 902 is searched around initial MV 900. The initial iteration results in the MV having the lowest cost of the initial 8 MVs being MV 904. In a second iteration, video decoder 300 then repeats search pattern 902 around MV 904. In this example, the finally selected MV after N iterations, is MV 906.

Figure 10:
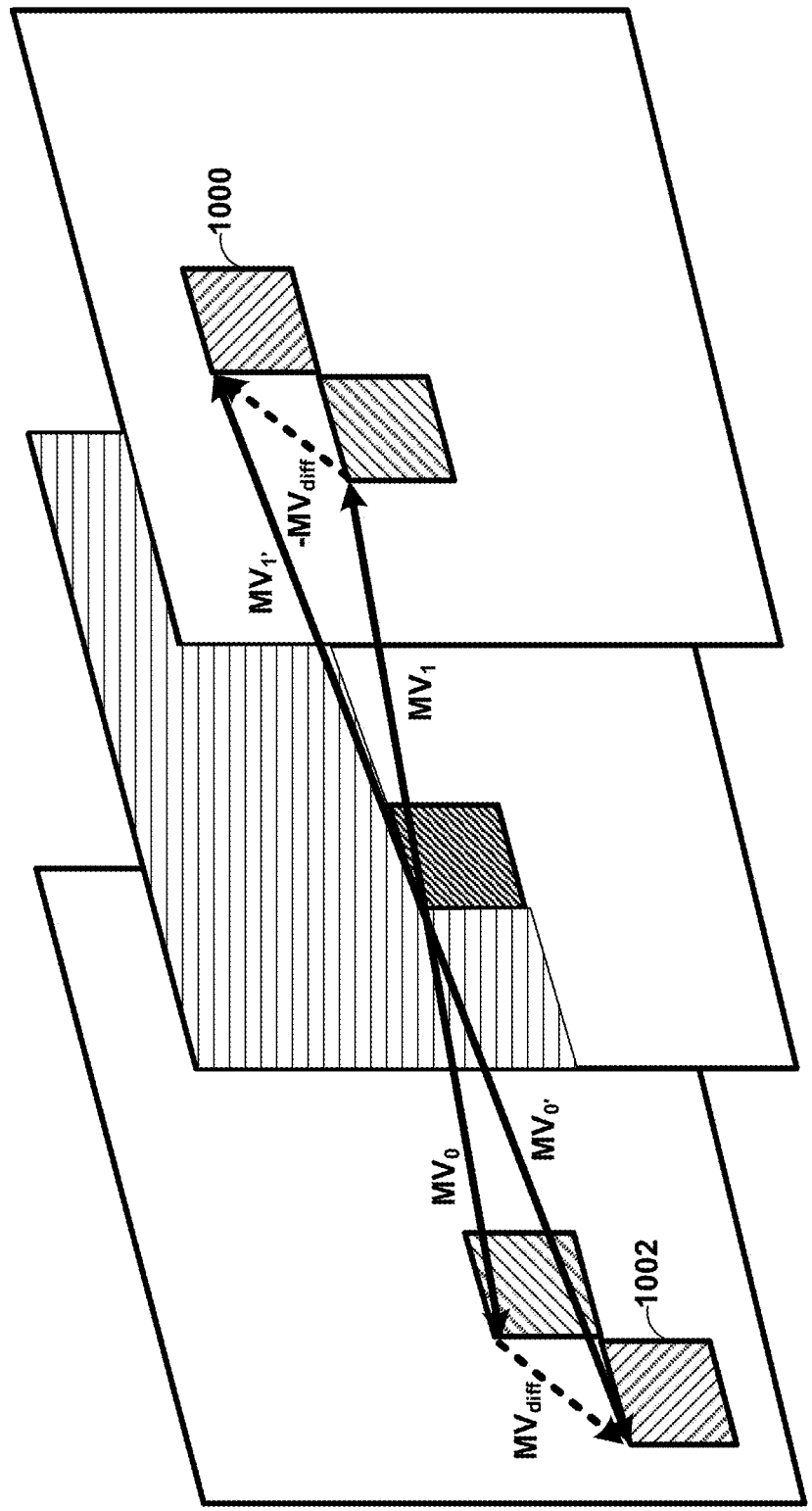
FIG. 10 is a conceptual diagram illustrating an example decoder side motion vector refinement.

FIG. 10 is a conceptual diagram illustrating an example decoder side motion vector refinement. To increase the accuracy of the MVs of the merge mode, a decoder-side motion vector refinement (DMVR) may be applied as in VVC Draft 10. For example, video decoder 300 may apply DMVR. In a bi-prediction operation, a refined MV is searched around the initial MVs in the reference picture list0 (L0) and reference picture list1 (L1). The DMVR method calculates the distortion between the two candidate blocks in L0 and L1. For example, video decoder 300 may calculate the distortion between the two candidate blocks. As illustrated in FIG. 10, the SAD between the blocks 1000 and 1002 based on each MV candidate around the initial MV is calculated. For example, video decoder 300 may determine the SAD between blocks 1000 and 1002. The MV candidate with the lowest SAD becomes the refined MV and used to generate the bi-predicted signal.

The refined MV derived by the DMVR techniques is used to generate the inter prediction samples and also used in temporal motion vector prediction for coding future pictures. Video decoder 300 may use the original MV in a deblocking process and also in spatial motion vector prediction for future CU coding.

DMVR of VVC Draft 10 is a sub-block-based merge mode with a pre-defined maximum PU of 16×16 luma samples. When the width and/or height of a CU are larger than 16 luma samples, the CU may be further split into sub-blocks with width and/or height equal to 16 luma samples. For example, video decoder 300 may further split larger CUs into sub-blocks with width and/or height equal to 16 luma samples.

An example searching scheme is now discussed. In DVMR, the search points surround the initial MV and the MV offset follows the MV difference mirroring rule discussed above. In other words, any points that are checked by video decoder 300 implementing DMVR, denoted by candidate MV pair (MV0, MV1), follow the following two equations:

$$MV0'=MV0+MV\_offset$$

$$MV1'=MV1-MV\_offset$$

Where MV_offset represents the refinement offset between the initial MV and the refined MV in one of the reference pictures. The refinement search range is two integer luma samples from the initial MV. The searching includes the integer sample offset search stage and fractional sample refinement stage.

A 25-point full search may be applied for integer sample offset searching. For example, video decoder 300 may perform a 25-point full search. The SAD of the initial MV pair is first calculated. If the SAD of the initial MV pair is smaller than a threshold, the integer sample stage of DMVR is terminated. Otherwise, SADs of the remaining 24 points are calculated and checked in raster scanning order. The point with the smallest SAD is selected as the output of integer sample offset searching stage. To reduce the penalty of the uncertainty of DMVR refinement, the original MV may be favored during the DMVR process. The SAD between the reference blocks referred by the initial MV candidates may be decreased by ¼ of the SAD value.

The integer sample search is followed by a fractional sample refinement. For example, video decoder 300 may perform the integer sample search and then perform the fractional sample refinement. To save on calculational complexity, the fractional sample refinement may be derived by using a parametric error surface equation, instead of additional searches with a SAD comparison. The fractional sample refinement is conditionally invoked based on the output of the integer sample search stage. When the integer sample search stage is terminated with the center having the smallest SAD in either the first iteration or the second iteration search, the fractional sample refinement is further applied.

In parametric error surface-based sub-pixel offsets estimation, the center position cost and the costs at four neighboring positions from the center are used to fit a two dimensional (2-D) parabolic error surface equation of the following form $$E(x,y)=A(x-x_{min})^2+B(y-y_{min})^2+C$$

where $(x_{min}, y_{min})$ corresponds to the fractional position with the least cost, A and B are constants, and C corresponds to the minimum cost value. By solving the above equations by using the cost value of the five search points, the location of the minimum ($x_{min}$, $y_{min}$) is computed as:

$$x_{min}=(E(-1,0)-E(1,0))/(2(E(-1,0)+E(1,0)-2E(0,0)))$$

$$y_{min}=(E(0,-1)-E(0,1))/(2((E(0,-1)+E(0,1)-2E(0,0)))$$

The values of $x_{min}$ and $y_{min}$ are automatically constrained to be between −8 and 8 since all cost values are positive and the smallest value is E(0,0). This corresponds to a half pel offset with 1/16th-pel MV accuracy in VVC Draft 10. The computed fractional ($x_{min}$, $y_{min}$) is added to the integer distance refinement MV to get the sub-pixel accurate refinement delta MV.

Bilinear-interpolation and sample padding are now discussed. These techniques may be applied by video decoder 300. In VVC Draft 10, the resolution of the MVs is 1/16 luma samples. The samples at the fractional position may be interpolated using an 8-tap interpolation filter. In DMVR, the search points surround the initial fractional-pel MV with integer sample offset. Therefore, the samples of those fractional positions need to be interpolated for the DMVR search. To reduce calculation complexity, a bi-linear interpolation filter is used to generate the fractional samples for searching in DMVR. Another effect is that by using a bi-linear filter with a 2-sample search range, the DVMR does not access more reference samples compared to the normal motion compensation process. After the refined MV is attained with the DMVR search, the normal 8-tap interpolation filter is applied to generate the final prediction. In order to not access more reference samples than the normal motion compensation process, samples which are not needed for the interpolation process based on the original MV, but are needed for the interpolation process based on the refined MV, will be padded from available samples.

Example enabling conditions for DMVR are now discussed. In one example, DMVR may be enabled if the following conditions are all satisfied: 1) CU level merge mode is used with a bi-prediction MV; 2) One reference picture is in the past and another reference picture is in the future with respect to the current picture; 3) The distances (e.g., POC difference) from both reference pictures to the current picture are the same; 4) the CU has more than 64 luma samples; 5) Both the CU height and the CU width are larger than or equal to 8 luma samples; 6) Bi-prediction with CU weights (BCW) weight index indicates equal weight; 7) Weighted prediction (WP) is not enabled for the current block; and 8) Combined inter-intra prediction (CIIP) mode is not used for the current block.

Bi-directional optical flow is now discussed. Video decoder 300 may use bi-directional optical flow (BDOF) to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement ($v_x$,$v_y$) is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i,j) \text{ and } \frac{\partial I^{(k)}}{\partial y}(i,j),$$

k=0,1, of the two prediction signals are computed by directly calculating the difference between two neighboring samples, e.g., $$\frac{\partial I^{(k)}}{\partial x}(i,j) = (I^{(k)}(i+1,j) \gg shift1) - (I^{(k)}(i-1,j) \gg shift1)$$

$$\frac{\partial I^{(k)}}{\partial y}(i,j) = (I^{(k)}(i,j+1) \gg shift1) - (I^{(k)}(i,j-1) \gg shift1)$$

where $I^{(k)}$ (i,j) are the sample values at coordinate (i,j) of the prediction signal in list k, k=0,1, and shift1 is calculated based on the luma bit depth, bitDepth, and shift1 is set to be equal to 6.

Then, the auto- and cross-correlation of the gradients, $S_1$, $S_2$, $S_3$, $S_5$ and $S_6$, are calculated as $$S_1=\Sigma_{(i,j)\in\Omega}|\psi_x(i,j)|, S_3=\Sigma_{(i,j)\in\Omega}\theta(i,j)\cdot(-sign(\psi_x(i,j)))$$

$$S_2=\Sigma_{(i,j)\in\Omega}\psi_x(i,j)\cdot sign(\psi_y(i,j))$$

$$S_5=\Sigma_{(i,j)\in\Omega}|\psi_y(i,j)|, S_6=\Sigma_{(i,j)\in\Omega}\theta(i,j)\cdot(-sign(\psi_y(i,j)))$$

where $$\psi_x(i,j) = \left(\frac{\partial I^{(1)}}{\partial x}(i,j) + \frac{\partial I^{(0)}}{\partial x}(i,j)\right) \gg shift3$$

$$\psi_y(i,j) = \left(\frac{\partial I^{(1)}}{\partial y}(i,j) + \frac{\partial I^{(0)}}{\partial y}(i,j)\right) \gg shift3$$

$$\theta(i,j) = (I^{(1)}(i,j) \gg shift2) - (I^{(0)}(i,j) \gg shift2)$$

where Ω is a 6×6 window around the 4×4 sub-block, the value of shift2 is set to be equal to 4, and the value of shift3 is set to be equal to 1.

The motion refinement ($v_x$, $v_y$) is then derived using the cross- and auto-correlation terms using the following:

$$v_x=S_1>0?clip3(-th'_{B10}, th'_{B10}-((S_3\ll 2)\gg\lfloor\log_2 S_1\rfloor)):0$$

$$v_y=S_5 0?clip3(-th'_{B10}, th'_{B10}-((S_6\ll 2)-((v_x\cdot S_2)\gg 1))\gg\lfloor\log_2 S_5\rfloor)):0$$

Where, $th'_{B10}=1\ll 4$. $\lfloor\cdot\rfloor$ is the floor function.

$$Clip3(x,y,z) = \begin{cases} x; & z<x \\ y; & z>y \\ z; & \text{otherwise} \end{cases}$$

Based on the motion refinement and the gradients, the following adjustment is calculated for each sample in the 4×4 sub-block:

$$b(x,y) = v_x \cdot \left(\frac{\partial I^{(1)}(x,y)}{\partial x} - \frac{\partial I^{(0)}(x,y)}{\partial x}\right) + v_y \cdot \left(\frac{\partial I^{(1)}(x,y)}{\partial y} - \frac{\partial I^{(0)}(x,y)}{\partial y}\right)$$

Finally, the BDOF samples of the CU are calculated by adjusting the bi-prediction samples as follows:

$$pred_{BDOF}(x,y)=(I^{(0)}(x,y)+I^{(1)}(x,y)+b(x,y)+o_{offset})\gg shift5$$

Wherein, shift5 is set equal to Max(3, 15-BitDepth) and the variable $o_{offset}$ is set equal to (1≪(shift5−1)).

These values are selected such that the multipliers in the BDOF process do not exceed 15-bits, and the maximum bit-width of the intermediate parameters in the BDOF process is kept within 32-bits.

Figure 11:
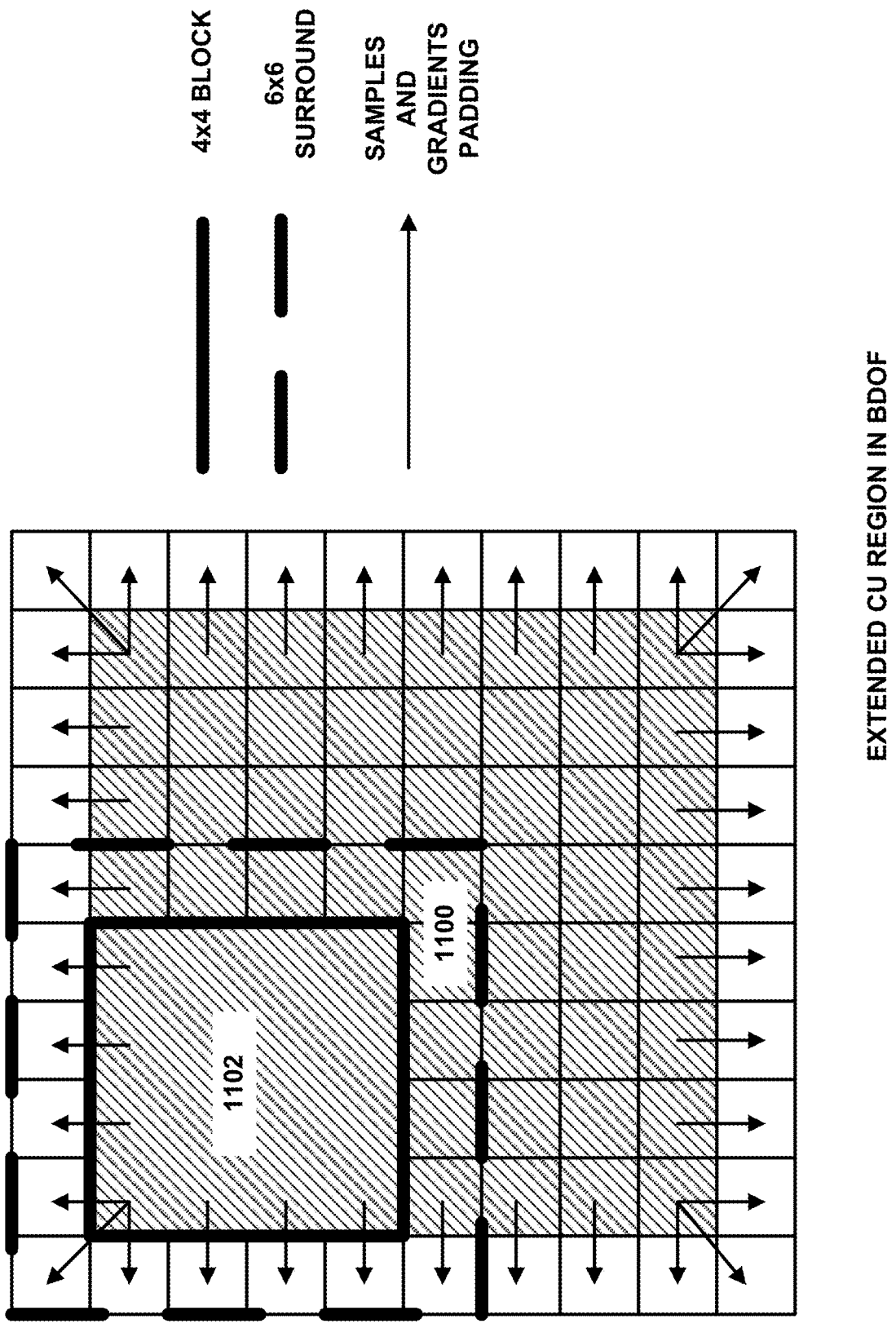
FIG. 11 is a conceptual diagram illustrating an example extended CU region used in BDOF.

FIG. 11 is a conceptual diagram illustrating an example extended CU region used in BDOF. In order to derive the gradient values, some prediction samples $I^{(k)}(i, j)$ in list k (k=0,1) outside of the current CU boundaries may need to be generated. As depicted in FIG. 11, the BDOF uses one extended row/column around the boundaries of CU 1100 boundaries. In order to control the computational complexity of generating the out-of-boundary prediction samples, prediction samples in the extended area (e.g., the outermost positions) are generated by taking the reference samples at the nearby integer positions (using floor( )operation on the coordinates) directly without interpolation, and the normal 8-tap motion compensation interpolation filter is used to generate prediction samples within CU 1100 (e.g., the hatched or patterned positions within CU 1100). These extended sample values may be used in a gradient calculation only. For the remaining steps in the BDOF process, if any sample and gradient values outside of CU 1100 boundaries are needed, they may be padded (e.g., repeated) from their nearest neighbors.

BDOF is used to refine the bi-prediction signal of a CU at the 4×4 sub-block level (e.g., sub-block 1102). In one example, BDOF may be applied to a CU if it satisfies all the following conditions: 1) The CU is coded using "true" bi-prediction mode, e.g., one of the two reference pictures is prior to the current picture in display order and the other is after the current picture in display order; 2) The CU is not coded using affine mode or the ATMVP merge mode; 3) The CU has more than 64 luma samples; 4) Both the CU height and the CU width are larger than or equal to 8 luma samples; 5) The BCW weight index indicates equal weight; 6) WP is not enabled for the current CU; and 7) CIIP mode is not used for the current CU.

In VVC Draft 10, DMVR is sub-block-based with a maximum of 16×16 luma samples. The refined MV of each sub-block has a delta MV (Δhor, Δver) from the original MV. The Δhor and Δver are the motion vector offsets in horizontal and vertical directions, respectively. The value range of Δhor and Δver is determined by the search range of DMVR. In VVC Draft 10, the search range of DMVR is [−2, 2]. Therefore, the refined motion vector has a maximum of ±2-pels offset from the original MV in both the horizontal and vertical directions.

The ±2-pels value range of delta MV may be too small for some blocks. For the blocks that have a best delta MV outside the ±2-pels value range of delta MV, video decoder 300 can not derive an optimal refined MV with DMVR having such a value range.

The value range of delta MV may be increased by increasing the DMVR search range. For example, the DMVR search range may be increased to [−8, 8]. The refined motion vector therefore has a maximum of ±8-pels offset from the original MV in both the horizontal and vertical directions.

However, increasing the search range increases the complexity of the DMVR process. For example, when increasing to a fixed search range [−8, 8], video decoder 300 would need to do more than 11 times more DMVR searches compared to a search range of [−2, 2] for a DMVR coded block. Additionally, a subset of sub-blocks in a DMVR coded block may have a similar refined MV, the sub-block-based DMVR process includes the MV refinement for each sub-block, even though a sub-set of derived MVs may be similar or identical. On the other hand, a sub-area of a sub-block may have an optimal refined MV different from other sub-areas of a sub-block. DMVR of VVC Draft 10 is 16×16 luma samples sub-block-based, therefore, video decoder 300 can not derive a different refined MV in, for example, an 8×8 or 4×4 sub-area within a 16×16 sub-block.

Techniques that may improve the DMVR process are herein disclosed.

Example 1. In this example, the refined motion vector of a sub-block within a W×H coding block is derived by a multi-pass decoder-side motion vector refinement (Multi-Pass DMVR) process. A pre-determined number N may represent the total number of passes of the multi-pass DMVR techniques. Video decoder 300 may employ these multi-pass DMVR techniques.

Figure 12:
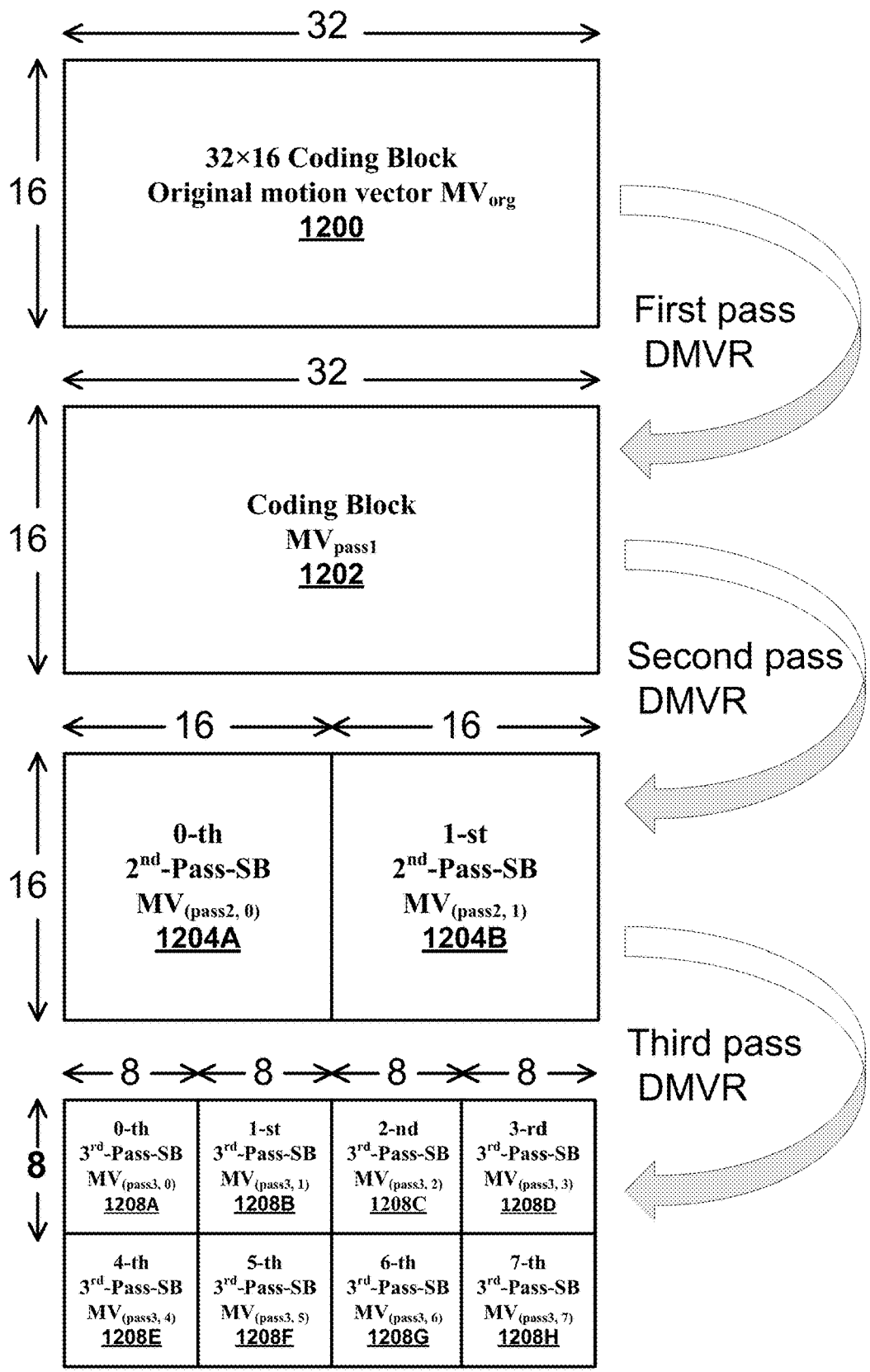
FIG. 12 is a conceptual diagram illustrating an example three-pass DMVR technique.

FIG. 12 is a conceptual diagram illustrating an example three-pass DMVR technique. In this example, a 32×16 coding block 1200 starts with an initial $MV_{org}$. The first pass may be block-based. Thus, the first pass may use the entire block 1200, such as the current PU or CU. Video decoder 300 implementing the first pass 1202 may generate a refined MV, $MV_{pass1}$. The second pass may be sub-block-based. In this example, video decoder 300 may divide block 1200 into two 16×16 sub-blocks, sub-blocks 1204A-1204B. Video decoder 300 implementing the second pass may generate a refined MV for each of sub-block 1204A ($MV_{(pass2, 0)}$) and sub-block 1204B ($MV_{(pass2, 1)}$). In this example, video decoder 300 may divide block 1200 into eight 8×8 sub-blocks, sub-blocks 1208A-1208H. Video decoder 300 implementing the third pass may generate a refined MV for each of sub-blocks 1208A-1208G, as shown.

For example, video decoder 300 may apply a multi-pass DMVR to a motion vector for a block (e.g., block 1200) of video data to determine a refined motion vector and decode the block based on the refined motion vector. The multi-pass DMVR may include: a first pass, the first pass being block-based and applied to the block of the video data; a second pass, the second pass being sub-block-based and being applied to at least one second pass sub-block of the block of the video data, wherein a second pass sub-block width is equal to or less than a width of a first pass block, and a second pass sub-block height is equal to or less than a height of the first pass block; and a third pass, the third pass being sub-block-based and being applied to at least one third pass sub-block, wherein a third pass sub-block width is equal to or less than the second pass sub-block width, and a third pass sub-block height is equal to or less than the second pass sub-block height.

The Multi-Pass DMVR techniques starts with original motion vector $MV_{org}$ of the W×H coding block. The coding block may be a PU or a CU. The first pass may be block-based. The first pass may derive a refined motion vector $MV_{pass1}$ for the entire W×H coding block. The $MV_{pass1}$ may be saved and used as an initial motion vector for the succeeding pass.

The second pass may be sub-block-based, e.g., based on one or more sub-blocks of the W×H coding block. The sub-blocks in the second pass ($2^{nd}$-Pass-SB) may have a pre-determined maximum dimension sbW_1×sbH_1. The W×H coding block may be divided into K1 sub-blocks ($2^{nd}$-Pass-SB), wherein K1≥1. Each $2^{nd}$-Pass-SB may have a dimension M1×N1, wherein M1≤W and N1≤H. Each $2^{nd}$-Pass-SB may have an initial motion vector $MV_{pass1}$ (e.g., the MV derived from the first pass). The second pass may derive a refined motion vector $MV_{(pass2, i)}$ for each $2^{nd}$-Pass-SB, wherein i represent the indices of the $2^{nd}$-Pass- SBs, $0 \leq i \leq K1-1$. The $MV_{(pass2, i)}$ may be saved and used as initial motion vector for the succeeding pass.

The third pass may be sub-block-based, e.g., based on one or more sub-blocks of respective sub-blocks of the second pass. The sub-blocks in the third pass ($3^{rd}$-Pass-SB) have a pre-determined maximum dimension sbW_2×sbH_2, wherein, sbW_2≤sbW_1 and sbH_2≤sbH_1. Each i-th $2^{nd}$-Pass-SB in the second pass may be divided to K2 sub-blocks ($3^{rd}$-Pass-SB), wherein K2≥1. The total number of $3^{rd}$-Pass-SBs within the W×H coding block may be K2*K1. Each $3^{rd}$-Pass-SB may have a dimension M2×N2, wherein M2≤sbW_1 and N2≤sbH_1. Each $3^{rd}$-Pass-SB within i-th $2^{nd}$-Pass-SB may have an initial motion vector $MV_{(pass2, i)}$ (e.g., MV(s) derived during the second pass). The third pass derives a refined motion vector $MV_{(pass3, j)}$ for each $3^{rd}$-Pass-SB, wherein j represent the indices of the $3^{rd}$-Pass-SBs, $0 \leq j \leq K2*K1-1$. The $MV_{(pass3, j)}$ may be saved and used as initial motion vector for a succeeding pass.

In some examples, the multi-pass DMVR techniques continue until the P-th pass. Video decoder 300 performing MV refinement may derive the $MV_{(passP, i)}$ for each sub-block in the P-th pass ($P^{th}$-Pass-SB), wherein i represent the indices of the $P^{th}$-Pass-SB within the W×H coding block. The $MV_{(passP, i)}$ may be saved and used for deriving the prediction block of the current coding block. The $MV_{(passP, i)}$ represents the refined MVs for the i-th sub-block.

Example 2. As in Example 1, when both the p-th pass and the preceding pass (the (p−1)-th pass) of the DMVR techniques are sub-block-based, the p-th pass sub-block dimensions may be equal to or smaller than the sub-block dimensions in the preceding pass.

As in Example 1, the value range of delta motion vector MV(Δhor, Δver) in the p-th pass may be pre-determined. For example, minDeltaHorPassP≤Δhor≤maxDeltaHorPassP, minDeltaVerPassP≤Δver≤maxDeltaVerPassP. When the p-th pass is not the first pass (e.g., p>1), the value range of Δhor and Δver in the p-th pass may be equal to or smaller than the value range in the preceding pass. For example, minDeltaHorPassP≥minDeltaHorPass(P−1), maxDeltaHorPassP≤maxDeltaHorPass(P−1), minDeltaVerPassP≥minDeltaVerPass(P−1), maxDeltaVerPassP≤maxDeltaVerPass(P−1). As the p-th pass may start from the refined motion vector(s) of the preceding pass, the overall value range of the delta (final refined) motion vector is extended as compared to a single pass DMVR.

As in Example 1, when video decoder 300 determines to divide the current coding block into K sub-blocks, the sub-blocks may be in raster scan order from top-left to bottom-right of the current coding block.

Example 3—skip the p-th pass of the DMVR techniques. As in Example 1, the pre-determined number N may represent the total passes of the multi-pass DMVR techniques. Video decoder 300 implementing the multi-pass DMVR techniques may skip one or more passes to derive the final refined MV. In other words, video decoder 300 may derive the final refined motion vector by applying a subset of the multi-pass DMVR techniques. Skipping the p-th pass of the DMVR techniques may reduce the complexity of video decoder 300.

The determination of whether to skip a p-th pass of the DMVR techniques can be based on the result of the preceding pass of the DMVR techniques. For example, if the preceding pass derives a relatively optimal refined motion vector, the p-th pass may be skipped.

For example, video decoder 300 may apply a shortened multi-pass DMVR to a motion vector for a block. Video decoder 300 may determine to skip a given pass of the multi-pass DMVR for the block and skip the given pass of the multi-pass DMVR for the block based on the determination to skip the given pass. For example, the determining to skip the given pass may be based on a result of a preceding pass, such as when the refined MV of the preceding pass is relatively optimal (e.g., further refinement may not result in a change to the MV in terms of the MV (sub-pel) resolution or the cost of further refinement may outweigh the benefit of further refinement).

Example 4—Sub-block-based first pass DMVR techniques. In some hardware designs, the maximum size for motion compensation process maybe constrained, and a larger coding block may be split into multiple sub-blocks for the hardware processing. In some examples, the multi-pass DMVR techniques may start with a sub-block size min{P, W}×min{Q, H} for the first pass, wherein P and Q are predefined integer values that are determined by the hardware constraint.

As in Examples 1 and 3, the first pass of the DMVR techniques may be block-based. When the multi-pass DMVR techniques starts with a sub-block-based pass, the first pass of the DMVR techniques may also be known as a sub-block-based first pass DMVR technique or a skip first pass DMVR technique. Video decoder 300 may apply a sub-block-based first pass DMVR technique.

Example 5—skip the p-th pass of the DMVR techniques for a sub-area of a coding block. As in Examples 1 and 3, given a W×H coding block, the pre-determined number N may represent the total number of passes of the multi-pass DMVR techniques. Video decoder 300 may derive the refined motion vector for a sub-area of the coding block by applying N passes of the DMVR techniques. Video decoder 300 may derive the refined motion vector of a different sub-area of the coding block by applying M passes of the DMVR techniques, wherein, M<N. In other words, video decoder 300 may skip one or more passes to derive the final refined motion vector for a given sub-area of the coding block. A sub-area may include one or more sub-blocks of the coding block.

For example, video decoder 300 apply a shortened multi-pass DMVR to a motion vector of a block. Video decoder 300 may determine to skip a given sub-block-based pass of the multi-pass DMVR for a particular sub-area of the block (e.g., the different sub-area of the coding block mentioned in the paragraph above), the particular sub-area including one or more sub-blocks and skip the given sub-block-based pass of the multi-pass DMVR for the particular sub-area based on the determination to skip the given sub-block-based pass. For example, the determining to skip the given sub-block-based pass may be based on a result of a preceding pass, such as when the refined MV of the preceding pass is relatively optimal (e.g., further refinement may not result in a change to the MV in terms of the MV (sub-pel) precision or the cost of further refinement may outweigh the benefit of further refinement).

Example 6—Derive the refined motion vector in the p-th pass of DMVR. In this example, several decoder-side motion vector refinement techniques are described. With the multi-pass DMVR techniques, video decoder 300 may, through at least one pass, apply the bilateral matching based motion vector refinement discussed below, and/or, through at least one pass, apply the BDOF-based motion vector refinement. In other words, at least one pass of the multi-pass DMVR may include applying BDOF and/or at least one pass of the multi-pass DMVR may include applying bi-lateral matching. In one example, the first pass includes applying bi-lateral matching, the second pass includes applying bi-lateral matching, and the third pass includes applying BDOF.

Figure 13:
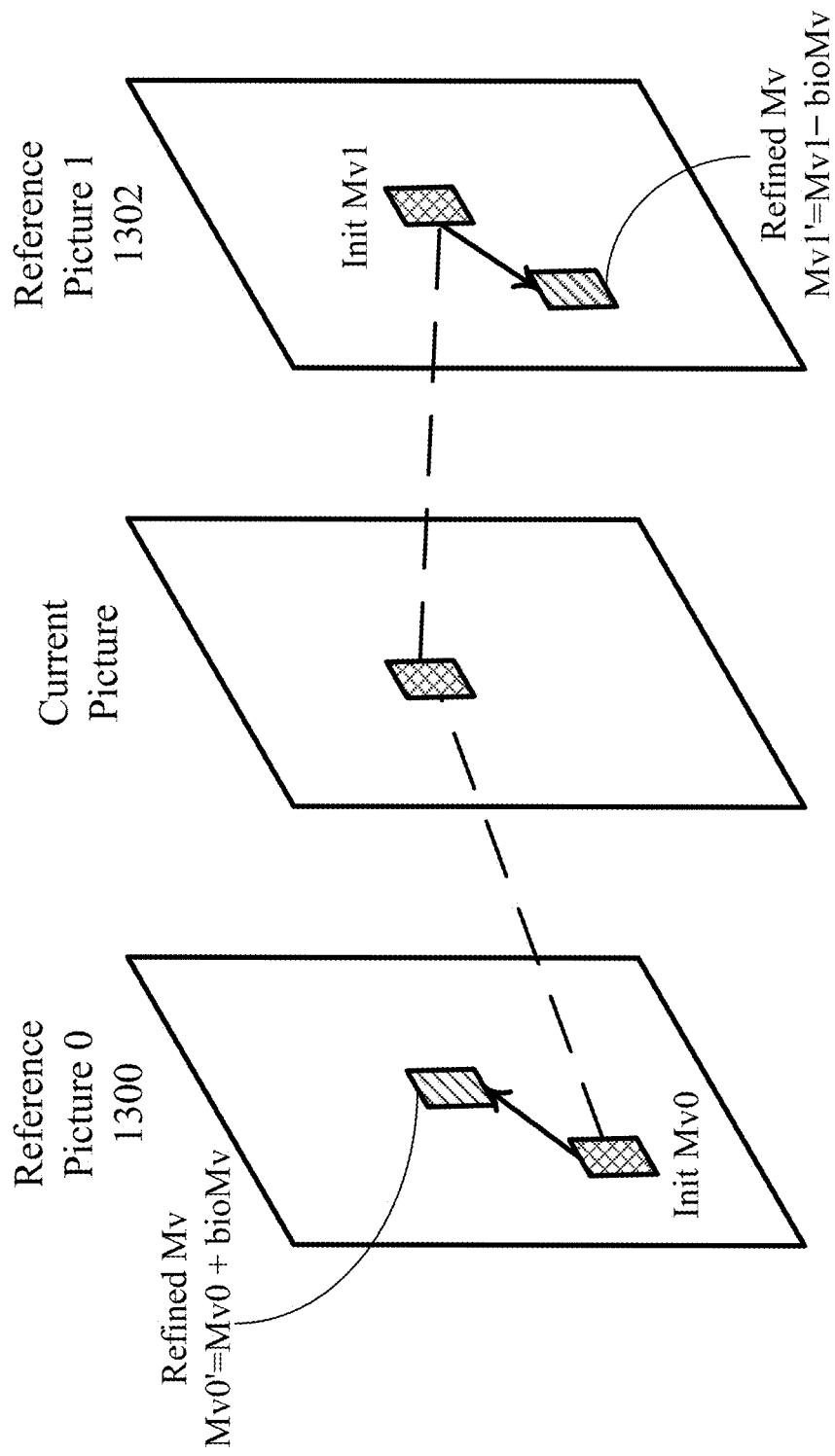
FIG. 13 is a conceptual diagram illustrating an example BDOF motion vector refinement.

FIG. 13 is a conceptual diagram illustrating an example BDOF motion vector refinement. Deriving a refined motion vector by bi-directional optical flow is now described. In this example, video decoder 300 may derive the refined motion vector in the p-th pass DMVR techniques by using bi-directional optical flow (BDOF). The BDOF MV refinement may be as follows:

$$Mv0'=Mv0+bioMv$$

$$Mv1'=Mv1-bioMv$$

Wherein, the Mv0 and Mv1 represent the initial Mv at the start of the p-th pass of current block/sub-block in the reference picture 0 1300 and reference picture 1 1302, respectively, the Mv0' and Mv1' represent the BDOF refined MV of current block in the reference picture 0 1300 and reference picture 1 1302 respectively, bioMv is the BDOF delta MV In the BDOF MV refinement process, the bioMv($\Delta$hor, $\Delta$ver) may be derived from the following steps:
1) Derive the horizontal and vertical gradients, $$\frac{\partial I^{(k)}}{\partial x}(i, j) \text{ and } \frac{\partial I^{(k)}}{\partial y}(i, j),$$

k=0,1, from the prediction signal predSig0 and pred-Sig1 as discussed above.
2) Derive the auto- and cross-correlation of the gradients, S1, S2, S3, S5 and S6 from the derived horizontal and vertical gradients and prediction signal predSig0 and predSig1 as discussed above.
3) Derive two parameters $v_x$ and $v_y$ as follows:

$$v_x=S_1>0?-((S_3\cdot 2^m)>>\lfloor \log_2 S_1 \rfloor):0$$

$$v_y=S_5>0?-((S_6\cdot 2^m-(v_x S_2)/2)>>\lfloor \log_2 S_5 \rfloor):0$$

wherein m is a pre-determined value. E.g., m=3
4) Derive delta MV bioMV($\Delta$hor, $\Delta$ver) as follows:

$$\Delta hor=clip3(minDeltaHorPass3, maxDeltaHorPass3, ((v_x+2^{n-1})>>n))$$

$$\Delta ver=clip3(minDeltaVerPass3, maxDeltaVerPass3, ((v_y+2^{n-1})>>n))$$

wherein
n is a pre-determined value. E.g., n=3
minDeltaHorPass3 is a pre-determined value. E.g., minDeltaHorPass3=−2
maxDeltaHorPass3 is a pre-determined value. E.g., maxDeltaHorPass3=2
minDeltaVerPass3 is a pre-determined value. E.g., minDeltaVerPass3=−2
maxDeltaVerPass3 is a pre-determined value. E.g., maxDeltaVerPass3=2

Video decoder 300 deriving a refined motion vector by bilateral matching is now described. Bilateral matching includes a search around two initial motion vectors MV0 and MV1 at the p-th pass in a pre-determined local search area in reference picture 0 and reference picture 1, respectively. The final MV0' and MV1' are derived based on the minimum bilateral matching cost.

The local search area of bilateral matching for the coding block has a horizontal search range, e.g., [sMinHor, sMaxHor] and a vertical search range, e.g., [sMinVer, sMaxVer]. The local search area of bilateral matching for the coding block may be (sMaxHor−sMinHor+1)×(sMaxVer−sMinVer+1).

As in example 2, where there is a pre-determined value range of delta motion vector MV($\Delta$hor, $\Delta$ver) in the p-th pass, the values of search range may be determined by the value range of the delta motion vector in the p-th pass DMVR techniques, as follows:
sMinHor≥minDeltaHorPassP
sMaxHor≤maxDeltaHorPassP
sMinVer≥minDeltaVerPassP
sMaxVer≤maxDeltaVerPassP Further decoder-side motion vector refinement methods are now described. The refined motion vector may be derived by alternate decoder-side motion vector derivation techniques, for example, template matching or decoder-side motion vector derivation (DMVD). Video decoder 300 implementing the p-th pass multi-pass DMVR techniques may use one of these motion vector refinement methods that are described in this disclosure. However, the details of the DMVR techniques may be different compared to the description in this document and still fall within the scope of this disclosure.

Example 7—Derive prediction signal at p-th pass DMVR techniques by applying an interpolation filter or by using preceding pass prediction signal. As in example 6, a motion vector refinement technique at the p-th pass starts with an initial motion vector at the p-th pass and prediction signal at the reference picture(s). The prediction signal at the reference picture(s) may be derived by applying an interpolation filter with initial motion vector information at the reference picture(s).

In this example, video decoder 300 may:
1) Derive a prediction signal with the p-th pass DMVR technique by applying an interpolation filter. The interpolation filter may be determined by the MV refinement technique (e.g., bilateral matching, BDOF, etc.) at the p-th pass; and/or
2) Derive a prediction signal with the p-th pass DMVR techniques by using the preceding prediction signal.

Video decoder 300 deriving a prediction signal with the p-th pass DMVR technique by applying an interpolation filter is now described. In the bilateral matching or DMVR technique for derivation of refined motion vector, some simplified interpolation filter may be used to generate the motion compensation results for searching. For example, the bi-linear interpolation filter may be used to generate the fractional samples for the searching process in bilateral matching or DMVR.

In some examples, when applying the BDOF-based techniques, as in example 6, to derive the refined motion vector in the p-th pass, the input can be samples generated by motion compensation using the original (non-simplified) interpolation filter.

In other examples, when applying the BDOF-based technique, as in example 6, to derive the refined motion vector in the p-th pass, the input can be samples generated by motion compensation using the simplified interpolation filter such as a bi-linear interpolation filter.

Video decoder 300 deriving a prediction signal in a p-th pass DMVR technique by using a preceding pass prediction signal is now described. In one example, video decoder 300 may determine whether to use the preceding pass prediction signal or not by checking the precision of delta motion vectors at the preceding pass. For example, 1) when the delta motion vector at the preceding pass is of integer-pel precision, the prediction signal at the p-th pass of the DMVR technique may be derived by using the preceding pass prediction signal; and 2) when the refined motion vector at the preceding pass is identical to the initial motion vector at the preceding pass, the prediction signal at the p-th pass of the DMVR technique may be derived by using the preceding pass prediction signal.

Example 8—An example of three-pass decoder-side motion refinement. In this example, video decoder 300 uses a three-pass decoder-side motion refinement technique. In this example, the process includes three-passes as follows: 1) The first pass is block-based. The refined motion vector is derived by applying bilateral matching-based motion vector refinement. The delta motion value range is e.g., [−8, 8] in the horizontal direction and e.g., [−8, 8] in the vertical direction; 2) The second pass is sub-block-based. The refined motion vector is derived by applying bilateral matching-based motion vector refinement. The maximum sub-block dimension is e.g., 16×16 luma samples. For example, the sub-blocks of the second pass have a predetermined maximum width of 16 luma samples and a predetermined maximum height of 16 luma samples. The delta motion value range is e.g., [−8, 8] in the horizontal direction and e.g., [−8, 8] in the vertical direction; and 3) The third pass is sub-block-based. The refined motion vector is derived by applying BDOF-based motion vector refinement. The maximum sub-block dimension is e.g., 8×8 luma samples. For example, sub-blocks of the third pass have a predetermined maximum width of 8 luma samples and a predetermined maximum height of 8 luma samples. The delta motion value range is e.g., [−2, 2] in the horizontal direction and e.g., [−2, 2] in the vertical direction.

For example, a delta motion value range for at least one of the first pass or the second pass may be [−8, 8] in a horizontal direction and [−8, 8] in a vertical direction and a delta motion value range for the third pass may be [−2, 2] in the horizontal direction and [−2, 2] in the vertical direction.

The aforementioned techniques can be applied in by video decoder 300 of a video coding system. The following is a detailed example of a multi-pass DMVR. Video decoder 300 may implement the techniques described here by all, or a subset, of the following steps to decode an inter predicted block in a picture from a bitstream:

1) Derive a position component (x, y) as the top-left luma position of the current block by decoding syntax elements in the bitstream.
2) Derive a size of the current block as a width value W and a height value H by decoding syntax elements in the bitstream.
3) Determine that the current block is an inter predicted block from decoding elements in the bitstream.
4) Derive the motion vector components (mvL0 and mvL1) and reference indices (refPicL0 and refPicL1) of the current block from decoding elements in the bitstream.
5) Infer a flag from decoding elements in the bitstream, wherein the flag indicates whether the decoder-side motion vector derivation (e.g., DMVR, bilateral merge, template matching, etc.) is applied to the current block or not. The inference scheme of the flag can be the same as but not limited to enabling conditions for DMVR discussed earlier in this disclosure. In another example, this flag can be explicitly signaled in the bitstream to avoid a complex condition check by video decoder 300.
6) (Pass 1) According to the aforementioned flag value, if the decision is to NOT apply DMVR (bilateral merge or template matching) to the current block, set the motion vector mv L0 and mvL1 as the motion vector of MV0pass1 and MV1pass1 respectively; otherwise (if the decision is to apply DMVR to the current block), the following applies.
   (a) Set the mvL0 and mvL1 of the current block as the initial motion vector for the current block
   (b) Determine a variable sHor and sVer, as follows, $sHor = \text{maximum}(maxDeltaHorPass1, W \times sFactor)$ $sVer = \text{maximum}(maxDeltaVerPass1, H \times sFactor)$ wherein,
     maxDeltaHorPass1 is a predetermined variable, (e.g., 8)
     maxDeltaVerPass1 is a predetermined variable, (e.g., 8)
     sFactor is a predetermined variable, (e.g., 0.5)
     sHor specifies the search range [−sHor, sHor] of DMVR in horizontal direction
     sVer specifies the search range [−sVer, sVer] of DMVR in vertical direction
   (c) Derive a prediction signal predSig0 from reference picture 0 by using the derived mv L0 and refPicL0. The width of predSig0 is equal to W+2×sHor. The height of predSig0 is equal to H+2×sVer.
   (d) Derive a prediction signal predSig1 from reference picture 1 by using the derived mvL1 and refPicL1. The width of predSig1 is equal to W+2×sHor. The height of predSig0 is equal to H+2×sVer.
   (e) Set a variable minCostPass1 to a maximum cost value
   (f) Set a variable best delta MV(Δhor_best, Δver_best) to a delta MV(0,0)
   (g) Loop through each or a subset of delta MV(Δhor, Δver) within the search range of the current block, −sVer<=Δver<=sVer, −sHor<=Δhor<=sHor,
     (i) Derive the bilateral matching cost bilCost at the current delta MV(Δhor, Δver)
     (ii) if bilCost is less than minCostPass1,
       (a) set minCostPass1 is equal to bilCost
       (b) set best delta MV(Δhor_best, Δver_best) is equal to MV(Δhor, Δver)
   (h) Derive the refined motion vector (mvL0+MV(Δhor_best, Δver_best)) as the motion vector of $MV0_{pass1}$
   (i) Derive the refined motion vector (mvL1−MV(Δhor_best, Δver_best)) as the motion vector of $MV1_{pass1}$
7) (Pass2) Derive number of sub-blocks in horizontal direction numSbX and in vertical direction numSbY, the sub-block width sbWidthPass2 and height sbHeightPass2 as follows:

$numSbX = (W > thW)?(W/thW):1$ $numSbY = (H > thH)?(H/thH):1$ $sbWidthPass2 = (W > thW)?thW:W$ $sbHeightPass2 = (H > thH)?thH:H$ wherein, thW and thH are predetermined integer values indicating a maximum sub-block width and height, respectively, for the second pass (e.g. thW=thH=16)
   (a) According to the aforementioned flag value, if the decision is to NOT apply DMVR (bilateral merge or template matching) to the current block, set the motion vector $MV0_{pass1}$ and $MV1_{pass\ 1}$ as the motion vector $MV0_{(pass2,\ i)}$ and $MV1_{(pass2,\ i)}$ respectively for each sub-block; otherwise (if the decision is to apply DMVR to the current block), the following applies.
(b) (Check whether to skip Pass 2 or not) derive a variable costThPass2 is equal to (thFactorPass2×W×H), wherein the thFactorPass2 is a pre-determined value, e.g., thFactorPass2=1. If minCostPass1 is less than costThPass2, set $MV0_{pass1}$ and $MV1_{pass1}$ as the motion vector $MV0_{(pass2, i)}$ and $MV1_{(pass2, i)}$ respectively for each sub-block, otherwise (if minCostPass1 is equal or greater than costThPass2), the following applies.
  (i) Set a position component (sbX, sbY)=(x, y) as the top-left luma position of the first sub-block of the current block.
  (ii) For each sub-block from top-left to bottom-right,
    (a) Set a variable i=(sbY/sbHeightPass2)*(W/sbWidthPass2)+(sbX/sbWidthPass2) as the current sub-block indices
    (b) Set $MV0_{pass1}$ and $MV1_{pass1}$ as the initial motion vector for the current sub-block
    (c) Determine a variable sHor and sVer, as follows, sHor=maximum(maxDeltaHorPass2,sbWidthPass2×sFactor)

sVer=maximum(maxDeltaVerPass2,sbHeightPass2×sFactor)

wherein,
      maxDeltaHorPass2 is a predetermined variable, (e.g., 8)
      maxDeltaVerPass2 is a predetermined variable, (e.g., 8)
      sFactor is a predetermined variable, (e.g., 0.5)
      sHor specifies the search range [−sHor, sHor] in horizontal direction for pass 2
      sVer specifies the search range [−sVer, sVer] in vertical direction for pass 2
    (d) Derive a prediction signal predSig0 from reference picture 0 by using the derived $MV0_{pass1}$ and refPicL0. The width of predSig0 is equal to sbWidthPass2+2×sHor. The height of predSig0 is equal to sbHeightPass2+2×sVer.
    (e) Derive a prediction signal predSig1 from reference picture 1 by using the derived $MV1_{pass1}$ and refPicL1. The width of predSig1 is equal to sbWidthPass2+2×sHor. The height of predSig0 is equal to sbHeightPass2+2×sVer.
    (f) Set a variable minCostPass2 to a maximum cost value
    (g) Set a variable best delta MV(Δhor_best, Δver_best) to a delta MV(0,0)
    (h) Loop through each or a subset of delta MV(Δhor, Δver) within the search range of the current sub-block, −sVer<=Δver<=sVer, −sHor<=Δhor<=sHor,
      (i) Derive the bilateral matching cost bilCost at the current delta MV(Δhor, Δver)
      (ii) if bilCost is less than minCostPass2,
        (a) set minCostPass2 is equal to bilCost
        (b) set best delta MV(Δhor_best, Δver_best) is equal to MV(Δhor, Δver)
    (i) Derive the refined motion vector ($MV0_{pass1}$+MV(Δhor_best, Δver_best)) as the motion vector of $MV0_{(pass2, i)}$
    (j) Derive the refined motion vector ($MV1_{pass1}$−MV(Δhor_best, Δver_best)) as the motion vector of $MV1_{(pass2, i)}$
    (k) update the sub-block top-left luma position as follows:

sbX=(sbX+sbWidthPass2)<W?sbX+sbWidthPass2:0 sbY=(sbX+sbWidthPass2)<W?sbY:sbY+sbHeightPass2

8) Infer a flag from decoding elements in the bitstream, wherein the flag indicates whether bi-directional optical flow is applied to the current block or not. The inference scheme of the flag can be the same as but not limited to the example set forth above. In another example, this flag can be explicitly signaled in the bitstream to avoid a complex condition check at decoder.
9) (Pass 3) According to the aforementioned flag value, when the decision is to apply BDOF to the current block, the following applies.
  (a) Derive number of sub-blocks in horizontal direction numSbX and in vertical direction numSbY, the sub-block width sbW and height sbH as follows:

numSbX=(W>thW)?(W/thW):1 numSbY=(H>thH)?(H/thH):1 sbWidthPass3=(W>thW)?thW:W sbHeightPass3=(H>thH)?thH:H wherein, thW and thH are predetermined integer values indicating a maximum sub-block width and height, respectfully, for the third pass (e.g., thW=thH=8)
  (b) Derive a variable costThPass3 is equal to (thFactorPass3×sbWidth×sbHeight), wherein the thFactorPass3 is a pre-determined value, e.g., thFactorPass3=32.
  (c) Set a position component (sbX, sbY)=(x, y) as the top-left luma position of the first sub-block of the current block.
  (d) For each sub-block from top-left to bottom-right,
    (i) Set a variable i=(sbY/sbHeightPass3)*(W/sbWidthPass3)+(sbX/sbWidthPass3) as the current sub-block indices of pass 3
    (ii) Set a variable j=(sbY/sbHeightPass2)*(W/sbWidthPass2)+(sbX/sbWidthPass2) as the current sub-block indices of pass 2
    (iii) Set $MV0_{(pass2, j)}$ and $MV1_{(pass2, j)}$ as the initial motion vector for the current sub-block
    (iv) Derive a prediction signal predSig0 from reference picture 0 by using the derived $MV0_{(pass2, j)}$ and refPicL0.
    (v) Derive a prediction signal predSig1 from reference picture 1 by using the derived $MV1_{(pass2, j)}$ and refPicL1.
    (vi) Derive a distortion cost distance between predSig0 and predSig1 of the current sub-block.
    (vii) (Check whether to skip sub-area Pass3 or not) if the distortion cost distance is less than costThPass3, set $MV0_{(pass2, j)}$ and $MV1_{(pass2, j)}$ as the refined motion vector $MV0_{(pass3, i)}$ and $MV1_{(pass3, i)}$ respectively for the current sub-block, otherwise (if the distortion cost distance is equal or greater than costThPass3), the following applies,
      (a) Derive the horizontal and vertical gradients, $$\frac{\partial I^{(k)}}{\partial x}(i, j) \text{ and } \frac{\partial I^{(k)}}{\partial y}(i, j),$$

k=0,1, from the prediction signals predSig0 and predSig1 as discussed above.

(b) Derive the auto- and cross-correlation of the gradients, S1, S2, S3, S5 and S6 from the derived horizontal and vertical gradients and prediction signals predSig0 and predSig1 as discussed above.

(c) Derive two parameters $v_x$ and $v_y$ as follows:

$$v_x = S_1 > 0 ? -((S_3 \cdot 2^m) >> \lfloor \log_2 S_1 \rfloor) : 0$$

$$v_y = S_5 > 0 ? -((S_6 \cdot 2^m - (v_x S_2)/(2)) >> \lfloor \log_2 S_5 \rfloor) : 0$$

wherein, m is a pre-determined value. E.g., m=3

(d) Derive delta MV bioMV(Δhor, Δver) as follows:

$$\Delta hor = clip3(minDeltaHorPass3, maxDeltaHorPass3, ((v_x + 2^{n-1}) >> n))$$

$$\Delta ver = clip3(minDeltaVerPass3, maxDeltaVerPass3, ((v_y + 2^{n-1}) >> n))$$

wherein,
n is a pre-determined value. E.g., n=3
minDeltaHorPass3 is a pre-determined value. E.g., minDeltaHorPass3=−2
maxDeltaHorPass3 is a pre-determined value. E.g., maxDeltaHorPass3=2
minDeltaVerPass3 is a pre-determined value. E.g., minDeltaVerPass3=−2
maxDeltaVerPass3 is a pre-determined value. E.g., maxDeltaVerPass3=2

(e) Derive the refined motion vector (MV0$_{(pass2, j)}$+bioMV(Δhor, Δver)) as the motion vector of MV0$_{(pass3, i)}$ (f) Derive the refined motion vector (MV1$_{(pass2, j)}$−bioMV(Δhor, Δver)) as the motion vector of MV1$_{(pass3, i)}$ (viii) update the sub-block top-left luma position as follows:

$$sbX = (sbX + sbWidthPass3) < W ? sbX + sbWidthPass3 : 0$$

$$sbY = (sbX + sbWidthPass3) < W ? sbY : sbY + sbHeightPass3$$

10) Derive the predicted block using the refined motion vector MV0$_{(pass3, i)}$ and MV1$_{(pass3, i)}$ of each sub-block for video decoding.

Example 9—When all passes of the multi-pass DMVR technique are skipped. When all passes of the multi-pass DMVR technique are skipped, the final refined motion vectors MV$_{(passP, i)}$ for each sub-block in the last pass (pass P) are equal to the initial motion vectors MV$_{Org}$.

For example, as in example 8, video decoder 300 may decide whether to apply BDOF-based motion vector refinement (pass 3) to the current block or not by the condition of applying DMVR (e.g., bilateral merge or template matching) to the current block. For example, if in step 5 in example 8 above, video decoder 300 decides not to apply DMVR to the current block, all three passes of multi-pass DMVR techniques are skipped. The refined motion vectors MV0$_{(pass3, i)}$ and MV1$_{(pass3, i)}$ for each sub-block in the step 10 of example 8 are equal to the mvL0 and mvL1, respectively. For example, video decoder 300 may determine not to apply DMVR to a block. Based on the determination to not apply DMVR to the block, video decoder 300 may skip all passes of the multi-pass DMVR and decode the block based on an initial motion vector.

Figure 14:
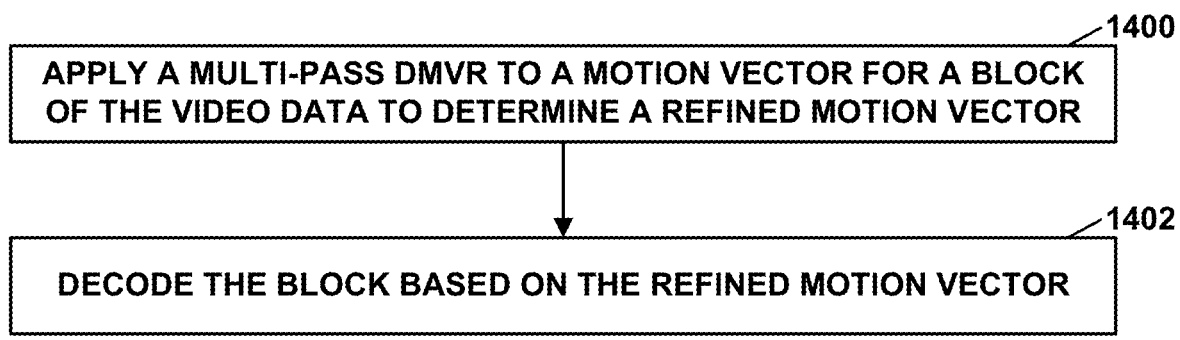
FIG. 14 is a flowchart illustrating example multi-pass DMVR techniques of this disclosure.

FIG. 14 is a flowchart illustrating example multi-pass DMVR techniques of this disclosure. Video decoder 300 may apply a multi-pass DMVR to an MV for a block of the video data to determine a refined MV (1400). For example, video decoder 300 may apply a multi-pass DMVR including a first pass, the first pass being block-based; a second pass, the second pass being sub-block-based, a second pass sub-block width being equal to or less than a width of a first pass block, and a second pass sub-block height being equal to or less than a height of the first pass block; and a third pass, the third pass being sub-block-based, a third pass sub-block width being equal to or less than the second pass sub-block width, and a third pass sub-block height being equal to or less than the second pass sub-block height.

Video decoder 300 may code the block based on the refined MV (1402). For example, video decoder 300 may use the refined MV to predict the block.

In some examples, the at least one third pass sub-block of the block of the video data are sub-blocks to the at least one second pass sub-block of the block of the video data. In some examples, video decoder 300 may apply the first pass to derive at least one first refined motion vector for the block of the video data and use the at least one first refined motion vector in the second pass. For example, video decoder 300 may use the first refined motion vector as an initial motion vector for the second pass. In some examples, video decoder 300 may apply the second pass to derive at least one second refined motion vector for at least one respective second pass sub-block and use the at least one second refined motion vector in the third pass. For example, video decoder 300 may derive one or more second refined motion vectors for one or more respective sub-blocks of the second pass and use the one or more second refined motion vectors for as initial motion vectors for the third pass. In some examples, video decoder 300 may apply the third pass to derive at least one third refined motion vector for at least one respective third pass sub-block and determine the at least one refined motion vector as the at least one third refined motion vector.

In some examples, at least one pass of the multi-pass DMVR includes applying BDOF or applying bi-lateral matching. In some examples, the first pass includes applying bi-lateral matching, the second pass includes applying bi-lateral matching, and the third pass includes applying BDOF.

In some examples, the at least one second pass sub-block has a predetermined maximum width of 16 luma samples and a predetermined maximum height of 16 luma samples. In some examples, the at least one third pass sub-block has a predetermined maximum width of 8 luma samples and a predetermined maximum height of 8 luma samples.

In some examples, a delta motion value range for at least one of the first pass or the second pass is [−8, 8] in a horizontal direction and [−8, 8] in a vertical direction and a delta motion value range for the third pass is [−2, 2] in the horizontal direction and [−2, 2] in the vertical direction.

In some examples, the block of the video data is a first block. In some examples, video decoder 300 may apply a shortened multi-pass DMVR to a motion vector for a second block of the video data. For example, video decoder 300 may determine to skip a given pass of the multi-pass DMVR for the second block and skip the given pass of the multi-pass DMVR for the second block based on the determination to skip the given pass of the multi-pass DMVR for the second block. In some examples, video decoder 300 may determine to skip the given pass based on a result of a preceding pass.

In some examples, the block of the video is a first block. In some examples, video decoder 300 may apply a shortened multi-pass DMVR to a motion vector for a second block of the video data. For example, video decoder 300 may determine to skip a given sub-block-based pass of the multi-pass DMVR for a particular sub-area of the second block of the video data, the particular sub-area comprising one or more sub-blocks of the second block. For example, video decoder 300 may skip the given sub-block-based pass of the multi-pass DMVR for the particular sub-area of the second block based on the determination to skip the given sub-block-based pass of the multi-pass DMVR for the particular sub-area of the second block. In some examples, video decoder 300 may determine to skip the given pass based on a result of a preceding pass.

In some examples, the block is a first block of the video data. In some examples, video decoder 300 may determine not to apply DMVR to a second block of the video data. Based on the determination to not apply DMVR to the second block, video decoder 300 may skip all passes of the multi-pass DMVR for the second block and decode the second block based on an initial motion vector for the second block.

Figure 15:
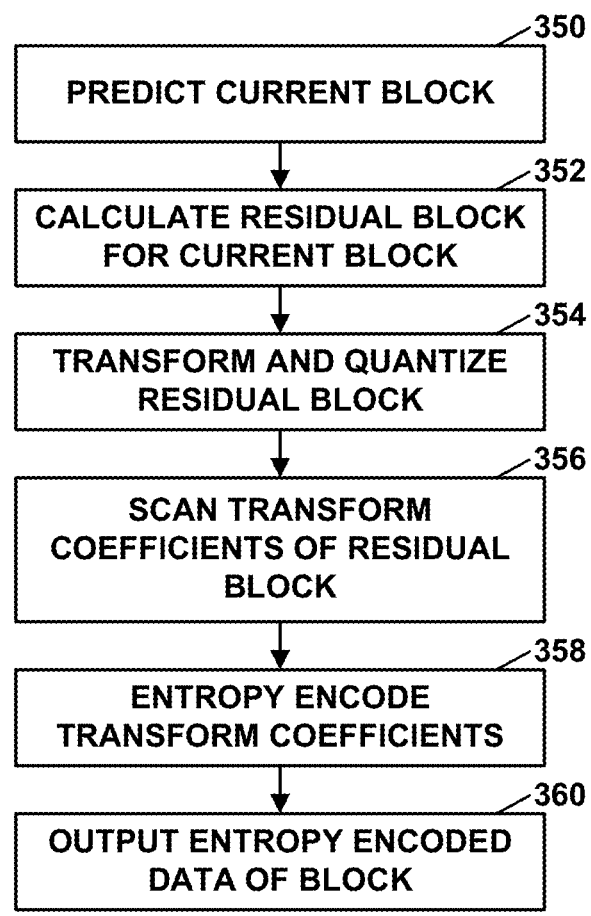
FIG. 15 is a flowchart illustrating an example method for encoding a current block in accordance with the techniques of this disclosure.

FIG. 15 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 15.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 16:
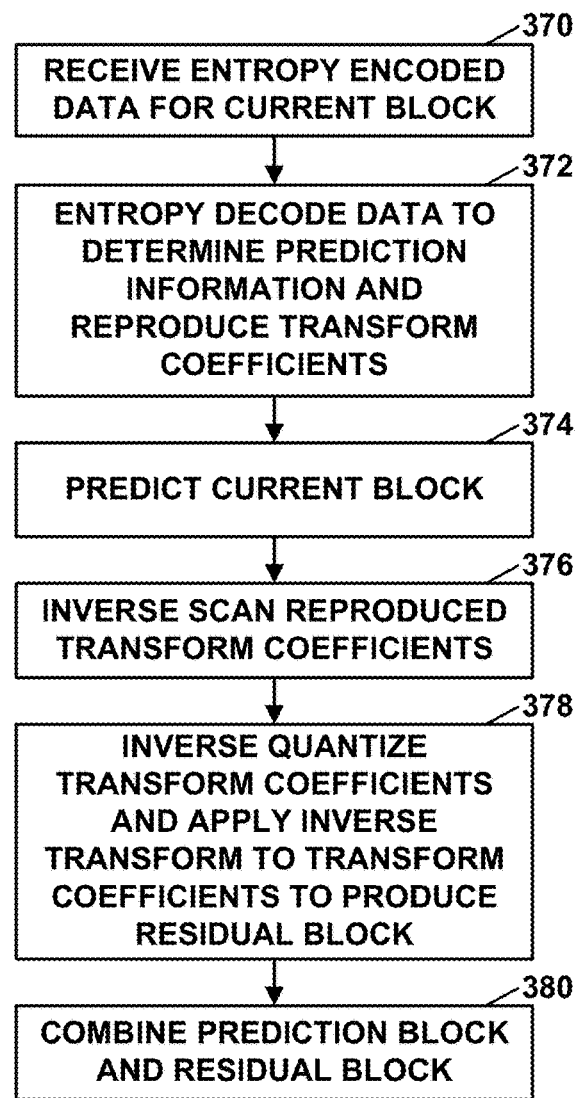
FIG. 16 is a flowchart illustrating an example method for decoding a current block in accordance with the techniques of this disclosure.

FIG. 16 is a flowchart illustrating an example method for decoding a current block of video data in accordance with the techniques of this disclosure. The current block may comprise a current CU. Although described with respect to video decoder 300 (FIGS. 1 and 4), it should be understood that other devices may be configured to perform a method similar to that of FIG. 16.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. As part of predicting the current block, video decoder 300 may use any of the multi-pass DMVR techniques of this disclosure, including, but not limited to the techniques of FIG. 14. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

This disclosure includes the following non-limiting clauses.

Clause 1A. A method of coding video data, the method comprising: applying a multi-pass decoder-side motion vector refinement (DMVR) to a motion vector for a block of the video data to determine a refined motion vector; and coding the block based on the refined motion vector.

Clause 2A. The method of clause 1A, wherein the total number of passes of the multi-pass DMVR is a predetermined integer number.

Clause 3A. The method of clause 1A or clause 2A, wherein multi-pass DMVR comprises: a first pass, the first pass being block-based; a second pass, the second pass being sub-block-based; and a third pass, the third pass being sub-block-based.

Clause 4A. The method of clause 3A, wherein applying the first pass derives a first refined motion vector.

Clause 5A. The method of clause 4A, wherein the refined motion vector is used in the second pass, wherein sub-blocks of the second pass have a predetermined maximum width and a predetermined maximum height, and wherein applying the second pass derives a second refined motion vector for at least one respective sub-block of the second pass.

Clause 6A. The method of clause 5A, wherein each second refined motion vector is used in the third pass, wherein sub-blocks of the third pass have a predetermined maximum width and a predetermined maximum height, and wherein applying the third pass derives a third refined motion vector for at least one respective sub-block of the third pass.

Clause 7A. The method of any combination of clauses 1A-6A, wherein the multi-pass DMVR is iterative.

Clause 8A. The method of any combination of clauses 1A-7A, wherein a sub-block of a pass is smaller or equal in size to a block or a sub-block of a preceding pass.

Clause 9A. The method of any combination of clauses 1A-8A, further comprising: determining whether to skip a given pass of the multi-pass DMVR; and skipping the given pass of the multi-pass DMVR based on the decision to skip the given pass.

Clause 10A. The method of clause 9A, wherein the determining whether to skip the given pass comprises determining that a given refined motion vector from a preceding pass is optimal.

Clause 11A. The method of any combination of clauses 1A-10A, further comprising: determining a given sub-block size to be a minimum of (P, W) and a minimum of (Q, H), wherein P and Q are predefined integers.

Clause 12A. The method of clause 11A, wherein P and Q are based on hardware constraints.

Clause 13A. The method of any combination of clauses 1A-12A, further comprising: determining whether to skip a sub-block pass of the multi-pass DMVR for a particular sub-block; and skipping the sub-block pass of the multi-pass DMVR for the particular sub-block based on the decision to skip the sub-block pass.

Clause 14A. The method of clause 13A, wherein the determining whether to skip the sub-block pass comprises determining that a sub-block refined motion vector from a preceding pass is optimal.

Clause 15A. The method of any combination of clauses 1A-14A, wherein at least one pass of the multi-pass DMVR comprises applying bi-directional optical flow.

Clause 16A. The method of any combination of clauses 1A-15A, wherein at least one pass of the multi-pass DMVR comprises applying bi-lateral matching.

Clause 17A. The method of any combination of clauses 1A-16A, wherein at least one pass of the multi-pass DMVR comprises applying template matching.

Clause 18A. The method of any combination of clauses 1A-17A, wherein at least one pass of the multi-pass DMVR comprises applying an interpolation filter.

Clause 19A. The method of any combination of clauses 1A-18A, wherein at least one pass of the multi-pass DMVR comprises applying a simplified interpolation filter.

Clause 20A. The method of any combination of clauses 1A-19A, further comprising: determining whether to skip all passes of the multi-pass DMVT; and based on the determination to skip all passes of the multi-pass DMVT, code the block based on an initial motion vector.

Clause 21A. The method of any of clauses 1A-20A, wherein coding comprises decoding.

Clause 22A. The method of any of clauses 1A-21A, wherein coding comprises encoding.

Clause 23A. A device for coding video data, the device comprising one or more means for performing the method of any of clauses 1A-22A.

Clause 24A. The device of clause 23A, wherein the one or more means comprise one or more processors implemented in circuitry.

Clause 25A. The device of any of clauses 23A or 24A, further comprising a memory to store the video data.

Clause 26A. The device of any combination of clauses 23A-25A, further comprising a display configured to display decoded video data.

Clause 27A. The device of any combination of clauses 23A-26A, wherein the device comprises one or more of a camera, a computer, a mobile device, a broadcast receiver device, or a set-top box.

Clause 28A. The device of any combination of clauses 23A-27A, wherein the device comprises a video decoder.

Clause 29A. The device of any combination of clauses 23A-28A, wherein the device comprises a video encoder.

Clause 30A. A computer-readable storage medium having stored thereon instructions that, when executed, cause one or more processors to perform the method of any of clauses 1A-22A.

Clause 1B. A method of decoding video data, the method comprising:
applying a multi-pass decoder-side motion vector refinement (DMVR) to a motion vector for a block of the video data to determine at least one refined motion vector; and decoding the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

Clause 2B. The method of clause 1B, wherein the at least one third pass sub-block of the block of the video data are sub-blocks to the at least one second pass sub-block of the block of the video data.

Clause 3B. The method of clause 1B or clause 2B, wherein applying the first pass derives at least one first refined motion vector for the block of the video data, and wherein the at least one first refined motion vector is used in the second pass.

Clause 4B. The method of clause 3B, wherein applying the second pass derives at least one second refined motion vector for at least one respective second pass sub-block, and wherein the at least one second refined motion vector is used in the third pass.

Clause 5B. The method of clause 4B, wherein applying the third pass derives at least one third refined motion vector for at least one respective third pass sub-block, and wherein the at least one refined motion vector is determined as the at least one third refined motion vector.

Clause 6B. The method of any combination of clauses 1B-5B, wherein at least one pass of the multi-pass DMVR comprises applying bi-directional optical flow (BDOF) or applying bi-lateral matching.

Clause 7B. The method of clause 6B, wherein the first pass comprises applying bi-lateral matching, the second pass comprises applying bi-lateral matching, and the third pass comprises applying BDOF.

Clause 8B. The method of any combination of clauses 1B-7B, wherein the at least one second pass sub-block has a predetermined maximum width of 16 luma samples and a predetermined maximum height of 16 luma samples.

Clause 9B. The method of any combination of clauses 1B-8B, wherein the at least one third pass sub-block has a predetermined maximum width of 8 luma samples and a predetermined maximum height of 8 luma samples.

Clause 10B. The method of any combination of clauses 1B-9B, wherein a delta motion value range for at least one of the first pass or the second pass is [−8, 8] in a horizontal direction and [−8, 8] in a vertical direction and a delta motion value range for the third pass is [−2, 2] in the horizontal direction and [−2, 2] in the vertical direction.

Clause 11B. The method of any combination of clauses 1B-10B, wherein the block of the video data is a first block, the method further comprising applying a shortened multi-pass DMVR to a motion vector for a second block of the video data, comprising: determining to skip a given pass of the multi-pass DMVR for the second block; and skipping the given pass of the multi-pass DMVR for the second block based on the determining to skip the given pass of the multi-pass DMVR for the second block.

Clause 12B. The method of clause 11B, wherein the determining to skip the given pass is based on a result of a preceding pass.

Clause 13B. The method of any combination of clauses 1B-12B, wherein the block of the video data is a first block, the method further comprising applying a shortened multi-pass DMVR to a motion vector for a second block of the video data, comprising: determining to skip a given sub-block-based pass of the multi-pass DMVR for a particular sub-area of the second block of the video data, the particular sub-area comprising one or more sub-blocks of the second block; and skipping the given sub-block-based pass of the multi-pass DMVR for the particular sub-area of the second block based on the determining to skip the given sub-block-based pass of the multi-pass DMVR for the particular sub-area of the second block.

Clause 14B. The method of clause 13B, wherein the determining to skip the given sub-block-based pass is based on a result of a preceding pass.

Clause 15B. The method of any combination of clauses 1B-10B, wherein the block is a first block of the video data, the method further comprising: determining not to apply DMVR to a second block of the video data; based on the determining to not apply DMVR to the second block, skipping all passes of the multi-pass DMVR for the second block; and decoding the second block based on an initial motion vector for the second block.

Clause 16B. A device for decoding video data, the device comprising: memory configured to store the video data; and one or more processors implemented in circuitry and communicatively coupled to the memory, the one or more processors being configured to: apply a multi-pass decoder-side motion vector refinement (DMVR) to a motion vector for a block of the video data to determine at least one refined motion vector; and decode the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

Clause 17B. The device of clause 16B, wherein the at least one third pass sub-block of the block of the video data are sub-blocks to the at least one second pass sub-block of the block of the video data.

Clause 18B. The device of clause 16B or clause 17B, wherein the one or more processors are configured to apply the first pass to derive at least one first refined motion vector for the block of the video data and to use the at least one first refined motion vector in the second pass.

Clause 19B. The device of clause 18B, wherein the one or more processors are configured to apply the second pass to derive at least one second refined motion vector for at least one respective second pass sub-block and to use the at least one second refined motion vector in the third pass.

Clause 20B. The device of any clause 19B, wherein the one or more processors are configured to apply the third pass to derive at least one third refined motion vector for at least one respective third pass sub-block and to determine the at least one refined motion vector as the at least one third refined motion vector.

Clause 21B. The device of any combination of clauses 16B-20B, wherein at least one pass of the multi-pass DMVR comprises applying bi-directional optical flow (BDOF) or applying bi-lateral matching.

Clause 22B. The device of clause 21B, wherein the first pass comprises applying bi-lateral matching, the second pass comprises applying bi-lateral matching, and the third pass comprises applying BDOF.

Clause 23B. The device of any combination of clauses 16B-22B, wherein the at least one second pass sub-block has a predetermined maximum width of 16 luma samples and a predetermined maximum height of 16 luma samples.

Clause 24B. The device of any combination of clauses 16B-23B, wherein the at least one third pass sub-block has a predetermined maximum width of 8 luma samples and a predetermined maximum height of 8 luma samples.

Clause 25B. The device of any combination of clauses 16B-24B, wherein a delta motion value range for at least one of the first pass or the second pass is [−8, 8] in a horizontal direction and [−8, 8] in a vertical direction and a delta motion value range for the third pass is [−2, 2] in the horizontal direction and [−2, 2] in the vertical direction.

Clause 26B. The device of any combination of clauses 16B-25B, wherein the block of the video data is a first block, wherein the one or more processors are configured to apply a shortened multi-pass DMVR to a motion vector for a second block of the video data, and wherein to apply the shortened multi-pass DMVR to the motion vector for the second block, the one or more processors are configured to: determine to skip a given pass of the multi-pass DMVR for the second block; and skip the given pass of the multi-pass DMVR for the second block based on the determination to skip the given pass of the multi-pass DMVR for the second block.

Clause 27B. The device of clause 26B, wherein the one or more processors are configured to determine to skip the given pass is based on a result of a preceding pass.

Clause 28B. The device of any combination of clauses 16B-27B, wherein the block of the video data is a first block, wherein the one or more processors are configured to apply a shortened multi-pass DMVR to a motion vector for a second block of the video data, and wherein to apply the shortened multi-pass DMVR to the motion vector for the second block, the one or more processors are configured to: determine to skip a given sub-block-based pass of the multi-pass DMVR for a particular sub-area of the second block of the video data, the particular sub-area comprising one or more sub-blocks of the second block; and skip the given sub-block-based pass of the multi-pass DMVR for the particular sub-area of the second block based on the determination to skip the given sub-block-based pass of the multi-pass DMVR for the particular sub-area of the second block.

Clause 29B. The device of clauses 28B, wherein the one or more processors are configured to determine to skip the given sub-block-based pass is based on a result of a preceding pass.

Clause 30B. The device of any combination of clauses 16B-25B, wherein the block is a first block of the video data, the one or more processors are further configured to: determine not to apply DMVR to a second block of the video data; based on the determination to not apply DMVR to the second block, skip all passes of the multi-pass DMVR for the second block; and decode the second block based on an initial motion vector for the second block.

Clause 31B. A non-transitory computer-readable storage medium storing instructions, which, when executed, cause one or more processors to: apply a multi-pass decoder-side motion vector refinement (DMVR) to a motion vector for a block of video data to determine at least one refined motion vector; and decode the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

Clause 33B. A device for coding video data, the device comprising: means for applying a multi-pass decoder-side motion vector refinement (DMVR) to a motion vector for a block of the video data to determine at least one refined motion vector; and means for decoding the block based on the at least one refined motion vector, wherein the multi-pass DMVR comprises: a first pass, the first pass being block-based and applied to the block of the video data; a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data; and a third pass, the third pass being sub-block-based and applied to at least one third pass sub-block of the block of the video data, wherein a third pass sub-block width is equal to or less than the second pass sub-block width, and a third pass sub-block height is equal to or less than the second pass sub-block height.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of decoding video data, the method comprising:

applying a multi-pass decoder-side motion vector refinement (DMVR) to a motion vector for a block of the video data to determine at least one refined motion vector; and decoding the block based on the at least one refined motion vector, wherein the multi-pass DMVR comprises:
- a first pass, the first pass being block-based and applied to the block of the video data, wherein applying the first pass comprises applying bi-lateral matching to the block and deriving at least one first refined motion vector for the block of the video data;
- a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data, wherein the second pass uses the at least one first refined motion vector as an initial motion vector for the second pass, and wherein applying the second pass comprises applying bi-lateral matching to the at least one second pass sub-block and deriving at least one second refined motion vector for at least one respective second pass sub-block; and
- a third pass, the third pass being sub-block-based and applied to at least one third pass sub-block of the block of the video data, the third pass sub-block being a sub-block of the at least one respective second pass sub-block, wherein a third pass sub-block width is equal to or less than the second pass sub-block width, and a third pass sub-block height is equal to or less than the second pass sub-block height, and wherein the third pass uses the at least one second refined motion vector as an initial motion vector for the at least one third pass sub-block, wherein applying the third pass comprises applying bi-directional optical flow (BDOF) to the at least one third pass sub-block and deriving at least one third refined motion vector for at least one respective third pass sub-block, and wherein the at least one refined motion vector is based on the at least one third refined motion vector.

2. The method of claim 1, wherein the at least one second pass sub-block has a predetermined maximum width of 16 luma samples and a predetermined maximum height of 16 luma samples.

3. The method of claim 1, wherein the at least one third pass sub-block has a predetermined maximum width of 8 luma samples and a predetermined maximum height of 8 luma samples.

4. The method of claim 1, wherein a delta motion value range for at least one of the first pass or the second pass is [−8, 8] in a horizontal direction and [−8, 8] in a vertical direction and a delta motion value range for the third pass is [−2, 2] in the horizontal direction and [−2, 2] in the vertical direction.

5. The method of claim 1, wherein the block of the video data is a first block, the method further comprising applying a shortened multi-pass DMVR to a motion vector for a second block of the video data, comprising:
determining to skip a given pass of the multi-pass DMVR for the second block; and skipping the given pass of the multi-pass DMVR for the second block based on the determining to skip the given pass of the multi-pass DMVR for the second block.

6. The method of claim 5, wherein the determining to skip the given pass is based on a result of a preceding pass.

7. The method of claim 1, wherein the block of the video data is a first block, the method further comprising applying a shortened multi-pass DMVR to a motion vector for a second block of the video data, comprising:
applying a given sub-block-based pass of the multi-pass DMVR to a first sub-area of the second block of the video data, the first sub-area comprising a first one or more sub-blocks of the second block and deriving at least one refined motion vector for the first sub-area from applying the given sub-block-based pass of the multi-pass DMVR to the first sub-area;

determining to skip the given sub-block-based pass of the multi-pass DMVR for a second sub-area of the second block of the video data, the second sub-area comprising a second one or more sub-blocks of the second block, each of the first one or more sub-blocks of the second block being different than each of the second one or more sub-blocks of the second block; and skipping the given sub-block-based pass of the multi-pass DMVR for the second sub-area of the second block based on the determining to skip the given sub-block-based pass of the multi-pass DMVR for the second sub-area of the second block, and deriving at least one refined motion vector for the second sub-area based on a refined motion vector from a preceding pass of the multi-pass DMVR to the second sub-area.

8. The method of claim 7, wherein the determining to skip the given sub-block-based pass is based on a result of the preceding pass.

9. The method of claim 1, wherein the block is a first block of the video data, the method further comprising:
determining not to apply DMVR to a second block of the video data;

based on the determining to not apply DMVR to the second block, skipping all passes of the multi-pass DMVR for the second block; and decoding the second block based on an initial motion vector for the second block.

10. A device for decoding video data, the device comprising:
memory configured to store the video data; and one or more processors implemented in circuitry and communicatively coupled to the memory, the one or more processors being configured to:
apply a multi-pass decoder-side motion vector refinement (DMVR) to a motion vector for a block of the video data to determine at least one refined motion vector; and decode the block based on the at least one refined motion vector, wherein the multi-pass DMVR comprises:
- a first pass, the first pass being block-based and applied to the block of the video data, wherein applying the first pass comprises applying bi-lateral matching to the block and deriving at least one first refined motion vector for the block of the video data;
- a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data, wherein the second pass uses the at least one first refined motion vector as an initial motion vector for the second pass, and wherein applying the second pass comprises applying bi-lateral matching to the at least one second pass sub-block and deriving at least one second refined motion vector for at least one respective second pass sub-block; and a third pass, the third pass being sub-block-based and applied to at least one third pass sub-block of the block of the video data, the third pass sub-block being a sub-block of the at least one respective second pass sub-block, wherein a third pass sub-block width is equal to or less than the second pass sub-block width, and a third pass sub-block height is equal to or less than the second pass sub-block height, and wherein the third pass uses the at least one second refined motion vector as an initial motion vector for the at least one third pass sub-block, wherein applying the third pass comprises applying bi-directional optical flow (BDOF) to the at least one third pass sub-block and deriving at least one third refined motion vector for at least one respective third pass sub-block, and wherein the at least one refined motion vector is based on the at least one third refined motion vector.

11. The device of claim 10, wherein the at least one second pass sub-block has a predetermined maximum width of 16 luma samples and a predetermined maximum height of 16 luma samples.

12. The device of claim 10, wherein the at least one third pass sub-block has a predetermined maximum width of 8 luma samples and a predetermined maximum height of 8 luma samples.

13. The device of claim 10, wherein a delta motion value range for at least one of the first pass or the second pass is [−8, 8] in a horizontal direction and [−8, 8] in a vertical direction and a delta motion value range for the third pass is [−2, 2] in the horizontal direction and [−2, 2] in the vertical direction.

14. The device of claim 10, wherein the block of the video data is a first block, wherein the one or more processors are configured to apply a shortened multi-pass DMVR to a motion vector for a second block of the video data, and wherein to apply the shortened multi-pass DMVR to the motion vector for the second block, the one or more processors are configured to:
determine to skip a given pass of the multi-pass DMVR for the second block; and
skip the given pass of the multi-pass DMVR for the second block based on the determination to skip the given pass of the multi-pass DMVR for the second block.

15. The device of claim 14, wherein the one or more processors are configured to determine to skip the given pass is based on a result of a preceding pass.

16. The device of claim 10, wherein the block of the video data is a first block, wherein the one or more processors are configured to apply a shortened multi-pass DMVR to a motion vector for a second block of the video data, and wherein to apply the shortened multi-pass DMVR to the motion vector for the second block, the one or more processors are configured to:

apply a given sub-block-based pass of the multi-pass DMVR for a first sub-area of the second block of the video data, the first sub-area comprising a first one or more sub-blocks of the second block and derive at least one refined motion vector for the first sub-area from applying the given sub-block-based pass of the multi-pass DMVR to the first sub-area;
determine to skip the given sub-block-based pass of the multi-pass DMVR for a second sub-area of the second block of the video data, the second sub-area comprising a second one or more sub-blocks of the second block, each of the first one or more sub-blocks of the second block being different than each of the second one or more sub-blocks of the second block; and
skip the given sub-block-based pass of the multi-pass DMVR for the second sub-area of the second block based on the determination to skip the given sub-block-based pass of the multi-pass DMVR for the second sub-area of the second block and derive at least one refined motion vector for the second sub-area based on a refined motion vector from a preceding pass of the multi-pass DMVR to the second sub-area.

17. The device of claim 16, wherein the one or more processors are configured to determine to skip the given sub-block-based pass is based on a result of the preceding pass.

18. The device of claim 10, wherein the block is a first block of the video data, the one or more processors are further configured to:
determine not to apply DMVR to a second block of the video data;
based on the determination to not apply DMVR to the second block, skip all passes of the multi-pass DMVR for the second block; and
decode the second block based on an initial motion vector for the second block.

19. A non-transitory computer-readable storage medium storing instructions, which, when executed, cause one or more processors to:
apply a multi-pass decoder-side motion vector refinement (DMVR) to a motion vector for a block of video data to determine at least one refined motion vector; and
decode the block based on the at least one refined motion vector,
wherein the multi-pass DMVR comprises:
a first pass, the first pass being block-based and applied to the block of the video data, wherein applying the first pass comprises applying bi-lateral matching to the block and deriving at least one first refined motion vector for the block of the video data;
a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data, wherein the second pass uses the at least one first refined motion vector as an initial motion vector for the second pass, and wherein applying the second pass comprises applying bi-lateral matching to the at least one second pass sub-block and deriving at least one second refined motion vector for at least one respective second pass sub-block; and
a third pass, the third pass being sub-block-based and applied to at least one third pass sub-block of the block of the video data, the third pass sub-block being a sub-block of the at least one respective second pass sub-block, wherein a third pass sub-block width is equal to or less than the second pass sub-block width, and a third pass sub-block height is equal to or less than the second pass sub-block height, and wherein the third pass uses the at least one second refined motion vector as an initial motion vector for the at least one third pass sub-block, wherein applying the third pass comprises applying bi-directional optical flow (BDOF) to the at least one third pass sub-block and deriving at least one third refined motion vector for at least one respective third pass sub-block, and wherein the at least one refined motion vector is based on the at least one third refined motion vector.

20. A device for coding video data, the device comprising:
means for applying a multi-pass decoder-side motion vector refinement (DMVR) to a motion vector for a block of the video data to determine at least one refined motion vector; and
means for decoding the block based on the at least one refined motion vector,
wherein the multi-pass DMVR comprises:
 a first pass, the first pass being block-based and applied to the block of the video data, wherein applying the first pass comprises applying bi-lateral matching to the block and deriving at least one first refined motion vector for the block of the video data;
 a second pass, the second pass being sub-block-based and applied to at least one second pass sub-block of the block of the video data, wherein a second pass sub-block width is equal to or less than a width of the block of the video data, and a second pass sub-block height is equal to or less than a height of the block of the video data, wherein the second pass uses the at least one first refined motion vector as an initial motion vector for the second pass, and wherein applying the second pass comprises applying bi-lateral matching to the at least one second pass sub-block and deriving at least one second refined motion vector for at least one respective second pass sub-block; and
 a third pass, the third pass being sub-block-based and applied to at least one third pass sub-block of the block of the video data, the third pass sub-block being a sub-block of the at least one respective second pass sub-block, wherein a third pass sub-block width is equal to or less than the second pass sub-block width, and a third pass sub-block height is equal to or less than the second pass sub-block height, and wherein the third pass uses the at least one second refined motion vector as an initial motion vector for the at least one third pass sub-block, wherein applying the third pass comprises applying bi-directional optical flow (BDOF) to the at least one third pass sub-block and deriving at least one third refined motion vector for at least one respective third pass sub-block, and wherein the at least one refined motion vector is based on the at least one third refined motion vector.

* * * * *